(12) United States Patent
Berman

(10) Patent No.: US 9,013,981 B2
(45) Date of Patent: Apr. 21, 2015

(54) SYSTEM AND METHOD FOR ROUTING DATA

(75) Inventor: Stuart B. Berman, Newport Beach, CA (US)

(73) Assignee: Emulex Corporation, Costa Mesa, CA (US)

(*) Notice: Subject to any disclaimer, the term of this patent is extended or adjusted under 35 U.S.C. 154(b) by 95 days.

(21) Appl. No.: 13/417,916

(22) Filed: Mar. 12, 2012

(65) Prior Publication Data

US 2012/0281693 A1 Nov. 8, 2012

Related U.S. Application Data

(60) Continuation of application No. 11/147,041, filed on Jun. 6, 2005, now Pat. No. 8,134,918, which is a continuation of application No. 09/330,398, filed on Jun. 11, 1999, now Pat. No. 6,904,053, which is a division of application No. 08/801,471, filed on Feb. 18, 1997, now Pat. No. 6,185,203.

(51) Int. Cl.
| | |
|---|---|
| *G01R 31/08* | (2006.01) |
| *H04L 12/66* | (2006.01) |
| *H04L 12/28* | (2006.01) |
| *H04L 12/703* | (2013.01) |
| *H04B 10/03* | (2013.01) |
| *H04L 12/931* | (2013.01) |
| *H04L 12/947* | (2013.01) |
| *H04L 12/935* | (2013.01) |

(52) U.S. Cl.
CPC .............. *H04L 45/28* (2013.01); *H04L 49/205* (2013.01); *H04L 49/25* (2013.01); *H04L 49/30* (2013.01); *H04L 49/351* (2013.01); *H04L 49/357* (2013.01); *H04L 49/604* (2013.01); *H04B 10/03* (2013.01)

(58) Field of Classification Search
USPC .......................................... 370/352–356, 389
See application file for complete search history.

(56) References Cited

U.S. PATENT DOCUMENTS

| | | | |
|---|---|---|---|
| 4,716,575 A | 12/1987 | Douros et al. | |
| 4,809,269 A | 2/1989 | Gulick | |
| 4,821,034 A | 4/1989 | Anderson et al. | |
| 4,862,451 A * | 8/1989 | Closs et al. .................. | 370/353 |
| 4,958,341 A | 9/1990 | Hemmady et al. | |
| 4,970,721 A | 11/1990 | Aczel et al. | |
| 5,007,051 A | 4/1991 | Dolkas et al. | |
| 5,042,032 A | 8/1991 | Dighe et al. | |

(Continued)

OTHER PUBLICATIONS

Chin, "Fibre Channel Offers Another Road to High-Speed Networking and I/O", Computer Technology Review, vol. 15, no. Suppl., Dec. 21, 1995, 45-47.

(Continued)

*Primary Examiner* — Brandon Renner
(74) *Attorney, Agent, or Firm* — McAndrews, Held & Malloy, Ltd.

(57) ABSTRACT

A system and method for routing data is provided. The system includes a one or more ports, one or more bypass circuits, a data router, and a logic circuit. The one or more bypass circuits are connected to and corresponding in number to the one or more ports. The data router is connected to the one or more bypass circuits. The data router is operable to: monitor for data, decode a priority according to the data, and move data through the one or more bypass circuits according to the priority. The logic circuit is connected to the data router for interfacing to a system bus of a host computer.

20 Claims, 23 Drawing Sheets

(56) References Cited

U.S. PATENT DOCUMENTS

| | | | |
|---|---|---|---|
| 5,262,625 A | 11/1993 | Tom et al. | |
| 5,305,444 A * | 4/1994 | Becker et al. | 711/207 |
| 5,319,644 A | 6/1994 | Liang | |
| 5,341,476 A | 8/1994 | Lowell | |
| 5,412,653 A | 5/1995 | Hoppe et al. | |
| 5,418,780 A | 5/1995 | Henrion | |
| 5,432,907 A | 7/1995 | Picazo, Jr. et al. | |
| 5,490,007 A * | 2/1996 | Bennett et al. | 398/52 |
| 5,502,719 A | 3/1996 | Grant et al. | |
| 5,519,695 A | 5/1996 | Purohit et al. | |
| 5,528,584 A | 6/1996 | Grant et al. | |
| 5,535,035 A | 7/1996 | DeFoster et al. | |
| 5,548,590 A | 8/1996 | Grant et al. | |
| 5,570,360 A | 10/1996 | Klausmeier et al. | |
| 5,592,160 A | 1/1997 | Bennett et al. | |
| 5,592,472 A | 1/1997 | Grant et al. | |
| 5,598,541 A | 1/1997 | Malladi | |
| 5,603,064 A | 2/1997 | Bennett | |
| 5,610,745 A | 3/1997 | Bennett | |
| 5,612,952 A * | 3/1997 | Motoyama | 370/412 |
| H1641 H | 4/1997 | Sharman | |
| 5,617,413 A * | 4/1997 | Monacos | 370/400 |
| 5,619,497 A | 4/1997 | Gallagher et al. | |
| 5,619,500 A | 4/1997 | Hiekali | |
| 5,638,518 A | 6/1997 | Malladi | |
| 5,655,140 A | 8/1997 | Haddock | |
| 5,655,153 A * | 8/1997 | Sandorfi | 710/38 |
| 5,659,718 A | 8/1997 | Osman et al. | |
| 5,745,727 A | 4/1998 | Chau et al. | |
| 5,751,715 A | 5/1998 | Chan et al. | |
| 5,760,836 A * | 6/1998 | Greenfield et al. | 375/240.05 |
| 5,768,530 A | 6/1998 | Sandorfi | |
| 5,768,551 A | 6/1998 | Bleiwess et al. | |
| 5,768,623 A | 6/1998 | Judd et al. | |
| 5,802,290 A * | 9/1998 | Casselman | 709/201 |
| 5,812,754 A | 9/1998 | Lui et al. | |
| 5,828,475 A | 10/1998 | Bennett et al. | |
| 5,841,990 A * | 11/1998 | Picazo et al. | 709/249 |
| 5,862,128 A * | 1/1999 | Cooperman et al. | 370/236 |
| 5,872,822 A | 2/1999 | Bennett | |
| 5,892,913 A | 4/1999 | Adiga et al. | |
| 5,894,481 A | 4/1999 | Book | |
| 5,898,828 A | 4/1999 | Pignolet et al. | |
| 5,914,798 A * | 6/1999 | Liu | 398/7 |
| 5,926,187 A * | 7/1999 | Kim | 345/629 |
| 5,941,972 A | 8/1999 | Hoese et al. | |
| 5,956,723 A | 9/1999 | Zhu | |
| 5,978,379 A | 11/1999 | Chan et al. | |
| 5,991,891 A * | 11/1999 | Hahn et al. | 714/4.21 |
| 6,005,849 A | 12/1999 | Roach et al. | |
| 6,014,383 A | 1/2000 | McCarty | |
| 6,014,715 A | 1/2000 | Stoevhase | |
| 6,031,842 A | 2/2000 | Trevitt et al. | |
| 6,038,047 A | 3/2000 | Nava et al. | |
| 6,038,217 A | 3/2000 | Lyles | |
| 6,041,381 A | 3/2000 | Hoese | |
| 6,055,228 A | 4/2000 | DeKoning et al. | |
| 6,057,863 A | 5/2000 | Olarig | |
| 6,118,776 A | 9/2000 | Berman | |
| 6,138,199 A | 10/2000 | Fleischer | |
| 6,151,316 A | 11/2000 | Crayford et al. | |
| 6,157,613 A | 12/2000 | Watanabe et al. | |
| 6,160,813 A | 12/2000 | Banks et al. | |
| 6,167,463 A | 12/2000 | Arp et al. | |
| 6,185,203 B1 | 2/2001 | Berman | |
| 6,192,048 B1 | 2/2001 | Nelson et al. | |
| 6,192,054 B1 | 2/2001 | Chan et al. | |
| 6,205,145 B1 | 3/2001 | Yamazaki | |
| 6,304,910 B1 | 10/2001 | Roach et al. | |
| 6,314,100 B1 | 11/2001 | Roach et al. | |
| 6,314,488 B1 | 11/2001 | Smith | |
| 6,324,181 B1 | 11/2001 | Wong et al. | |
| 6,356,944 B1 | 3/2002 | McCarty | |
| 6,400,730 B1 | 6/2002 | Latif et al. | |
| 6,414,953 B1 | 7/2002 | Lamarche et al. | |
| 6,426,947 B1 | 7/2002 | Banker et al. | |
| 6,470,007 B1 | 10/2002 | Berman | |
| 6,470,026 B1 | 10/2002 | Pearson et al. | |
| 6,614,796 B1 | 9/2003 | Black et al. | |
| 6,636,507 B1 | 10/2003 | Miyoshi et al. | |
| 6,904,053 B1 | 6/2005 | Berman | |
| 6,961,775 B2 | 11/2005 | Rao | |
| 6,975,590 B2 | 12/2005 | Killen, Jr. et al. | |
| 7,012,914 B2 | 3/2006 | Berman | |
| 7,145,877 B2 | 12/2006 | Natarajan et al. | |
| 7,362,769 B2 | 4/2008 | Black et al. | |
| 7,382,790 B2 | 6/2008 | Warren et al. | |
| 7,484,021 B2 | 1/2009 | Rastogi et al. | |
| 7,522,619 B2 | 4/2009 | Berman | |
| 7,542,676 B2 | 6/2009 | McGlaughlin | |
| 7,664,018 B2 | 2/2010 | Warren et al. | |
| 7,688,735 B1 | 3/2010 | Berman | |
| 7,770,208 B2 | 8/2010 | Barnett et al. | |
| 7,801,117 B2 | 9/2010 | Berman | |
| 7,801,118 B2 | 9/2010 | Berman | |
| 2003/0086377 A1 | 5/2003 | Berman | |
| 2003/0095549 A1 | 5/2003 | Berman | |
| 2005/0226259 A1 | 10/2005 | Berman | |
| 2005/0226260 A1 | 10/2005 | Berman | |
| 2008/0240137 A1 | 10/2008 | Berman | |
| 2009/0225772 A1 | 9/2009 | Berman | |
| 2010/0183022 A1 | 7/2010 | Berman | |

OTHER PUBLICATIONS

Fibre Channel Switch Fabric (FC-SW) REV. 3.3, American National Standard for Information Systems, Oct. 21, 1997, iii-x, 1-98.

Fibre Channel Link Encapsulation (FC-LE) REV. 1.1, American National Standard for Information Systems, Jun. 26, 1996, i-xv, 1-41.

Fibre Channel Physical and Signalling Interface—3 (FC-PH-3) REV 9.4, American National Standard for Information Systems, Nov. 5, 1997, i-xxi, 1-113.

Fibre Channel Private Loop SCSI Direct Attach (FC-PLDA) REV 2.1, American National Standard for Information Systems, Sep. 22, 1997, i-viii, 1-80, I-1-I-4.

Fibre Channel Arbitrated Loop (FC-AL-2) REV 6.1, American National Standard for Information Systems, Feb. 16, 1998, i-xiv, 1-104.

Fibre Channel Arbitrated Loop (FC-AL) REV 4.5, American National Standard for Information Systems, Jun. 1, 1995, ii-x, 1-92.

Fibre Channel Generic Services (FC-GS) REV 3.1, American National Standard for Information Systems, Aug. 7, 1996, i-xiv, 1-84, I-1-I-2.

Fibre Channel Single-Byte Command Code Sets (SBCCS) Mapping Protocol (FC-SB) REV 3.4, American National Standard for Information Systems, May 26, 1995, i-xiv, 1-102, I-1-I-5.

Fibre Channel Physical and Signalling Interface—2 (FC-PH-2) Rev 7.4, American National Standard for Information Systems, Sep. 10, 1996, i-xxii, 1-161, I-1-I-3.

Fibre Channel Physical and Signalling Interface (FC-PH) REV 4.3, American National Standard for Information Systems, Jun. 1, 1994, i-xxxiv, 1-388, I-1-I-9, and Table Definitions.

Fibre Channel Fabric Loop Attachment (FC-FLA), Rev. 2.7, NCITS working draft proposed Technical Report, Aug. 12, 1997, i-xiv, 1-122.

Malavalli, "Distributed Computing With Fibre Channel Fabric", Digest of Papers, IEEE COMPCON, Feb. 1992, 269-274.

Malavalli, "High Speed Fibre Channel Switching Fabric Services", Proceedings of SPIE, vol. 1577, Sep. 4, 1991, 216-226.

Martin, "Fabric Interconnection of Fibre Channel Standard Nodes", Proceedings of the SPIE, vol. 1784, Sep. 8, 1993, 65-71.

Meggyesi, "Fibre Channel Overview", Research Institute for Particle and Nuclear Physics, Aug. 15, 1994, 1-10.

PCT International Search Report, Jul. 20, 1998.

Platt, "Traffic Management in Frame Relay Networks", Computer Networks and ISDN Systems, vol. 23, No. 4, Jan. 1992, 305-316.

Ravidran, et al., "A Comparison of Blocking and Non-Blocking Packet Switching Techniques in Hierarchical Ring Networks", IEICE Transactions on Information and Systems 1, vol. E79-D, No. 8, Aug. 1996, 1130-1138.

(56) References Cited

OTHER PUBLICATIONS

Rickard, "Fibre Channel as a Network Backbone", WESCON, Sep. 27, 1994, 653-659.

Stephens, et al., "Fibre Channel : The Basics, Frame Routing", ANCOT Corporation, 1995, 9-1-10-17.

Stephens, et al., "Fibre Channel : The Basics", ANCOT Corporation, Jun. 1995, 5-6-5-9.

Varma, et al., "Using Camp-On to Improve the Performance of a Fibre Channel Switch", Proceedings of the Conference on Local Computer Networks, 1993, 247-255.

* cited by examiner

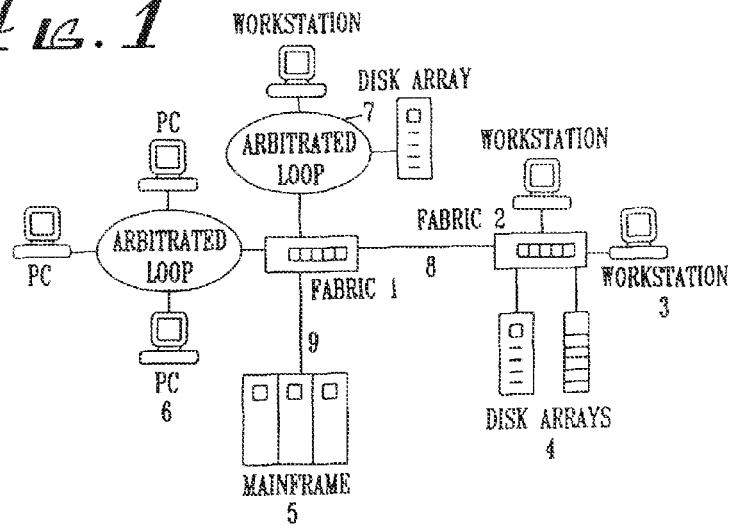
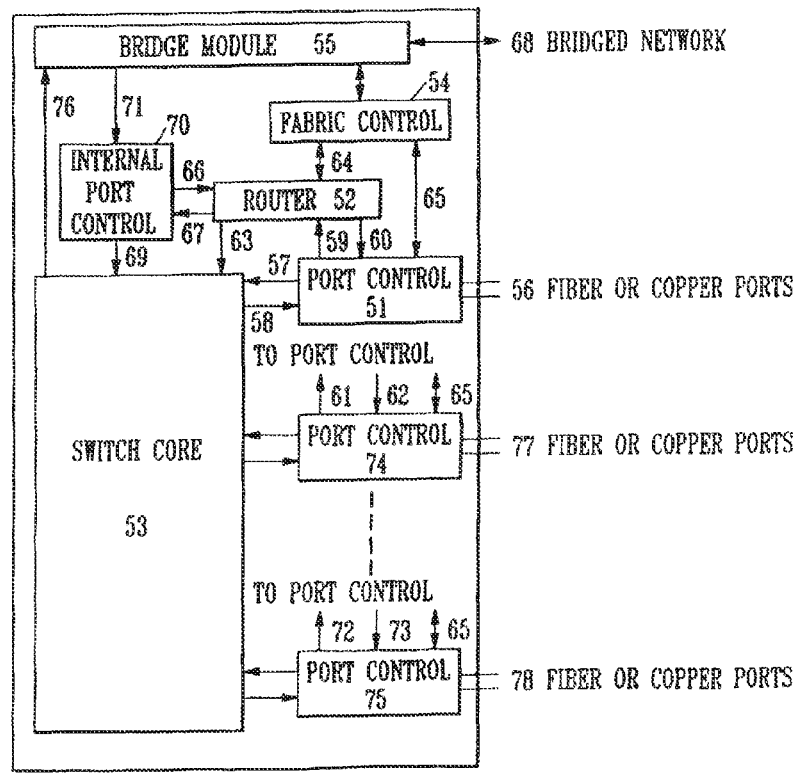

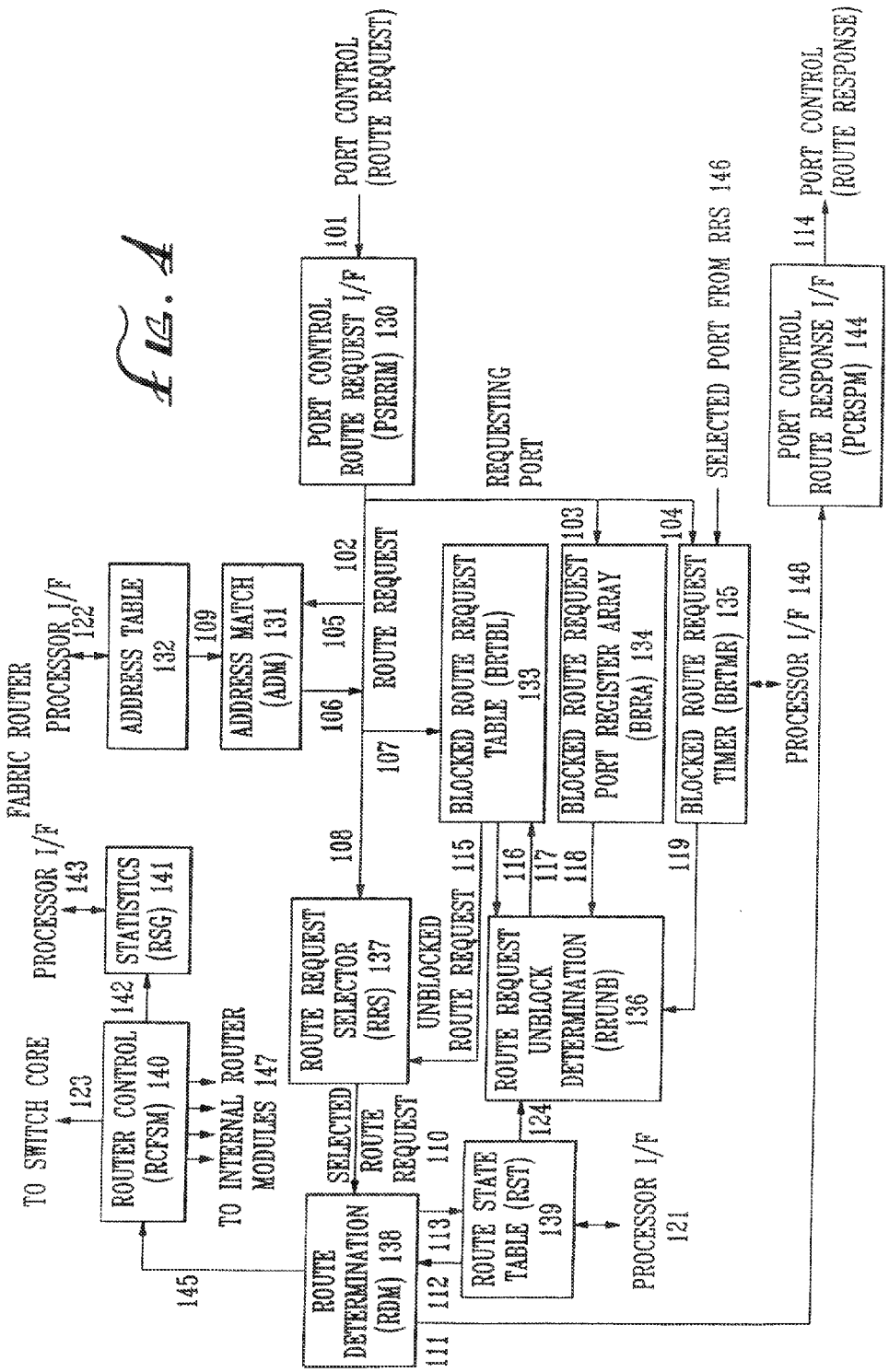

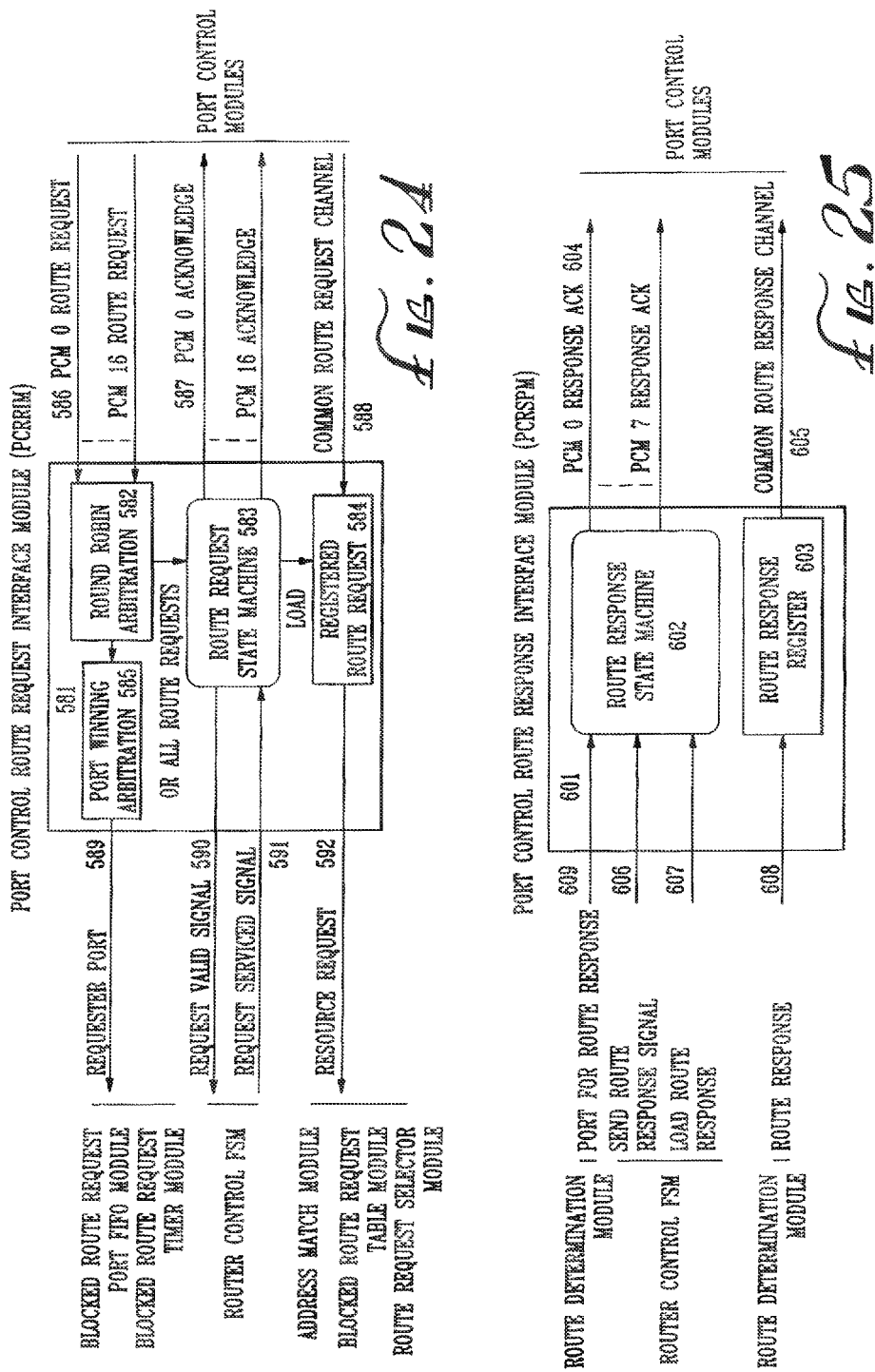

SYSTEM AND METHOD FOR ROUTING DATA

RELATED APPLICATIONS

This application is a continuation of U.S. application Ser. No. 11/147,041, filed Jun. 6, 2005, now U.S. Pat. No. 8,134,918, which is a continuation of U.S. application Ser. No. 09/330,398, filed Jun. 11, 1999, now U.S. Pat. No. 6,904,053, which is a divisional of U.S. application Ser. No. 08/801,471, filed Feb. 18, 1997, now U.S. Pat. No. 6,185,203. The above-referenced United States patent applications are all hereby incorporated herein by reference as if fully set forth herein.

FIELD OF THE INVENTION

The present invention relates to input/output channel and networking systems, and more particularly to a digital switch which switches Fibre Channel frames at link speeds of up to at least one gigabit per second (i.e., one billion bits per second).

BACKGROUND OF THE INVENTION

There is a never ending demand for increased computer system performance. A common limiting factor in computer system performance is the path from the main central processing unit (CPU) to storage, or the I/O path. The CPU usually requires data from attached storage many times faster than the I/O path. Fibre Channel is a standard which addresses this I/O bandwidth limitation.

Fibre Channel is an American National Standards Institute (ANSI) set of standards which describes a high performance serial transmission protocol which supports higher level storage and networking protocols such as HIPPI, IPI, SCSI, IP, ATM, FDDI and others. Fibre Channel was created to merge the advantages of channel technology with network technology to create a new I/O interface which meets the requirements of both channel and network users. Channel technology is usually implemented by I/O systems in a closed, structured and predictable environment where network technology usually refers to an open, unstructured and unpredictable environment.

Advantages of Fibre Channel include the following. First, it achieves high performance, which is a critical in opening the bandwidth limitations of current computer to storage and computer to computer interfaces at speeds up to 1 gigabit per second or faster. Second, utilizing fiber optic technology, Fibre Channel can overcome traditional I/O channel distance limitations and interconnect devices over distances of 6 miles at gigabit speeds. Third, it is high level protocol independent, enabling Fibre Channel to transport a wide variety of protocols over the same media. Fourth, Fibre Channel uses fiber optic technology which has very low noise properties. Finally, cabling is simple in that Fibre Channel typically replaces bulky copper cables with small lightweight fiber optic cables.

Fibre Channel supports three different topologies, point-to-point, arbitrated loop and fabric attached. The point-to-point topology attaches two devices directly. The arbitrated loop topology attaches devices in a loop. The fabric attached topology attaches a device directly to a fabric.

A Fibre Channel fabric is an entity which switches frames between connected devices. Fabric is a word which is synonymous with switch or router. The fabric must route the frame to the appropriate destination port or return a busy if the port is not available.

Because of the high link speeds, Fibre Channel fabrics face unique problems that are not present in current network switch design. Current network switches which support Ethernet, Fast Ethernet or Asynchronous Transfer Mode (ATM) protocols route incoming data at speeds up to ten to one hundred times slower than Fibre Channel fabrics. Current network switches also perform some incoming frame validation and network statistics collection. All these network switch features are more difficult to implement when the incoming frame rate is high, as in the case of Fibre Channel.

Route determination in network switches is usually performed by microprocessors. The requirement to route frames which are entering the fabric at speeds of up to one gigabit per second requires the fabric to route the frame in very little time. Routing depends not only on the incoming frame address but a host of other parameters and current state conditions as well. There are no currently available microprocessors which can in real time route sixteen lines of incoming frames with a link speed of 1 gigabit per second.

Frame validation creates another set of problems. In Fibre Channel fabrics frame validation must be performed at rates up to one hundred times faster than in Ethernet switches.

Statistics collection is also another function which must be performed in real time. Statistics collected are defined by the Fibre Channel fabric Management Information Base (MIB) and include the number of frames transmitted and received, the number of fabric rejects and fabric busies transmitted and received, etc. Gathering statistics for sixteen one gigabit per second ports creates new challenges.

Current fabric realizations use either fast microprocessors or digital signal processors to perform the route determination functions. Typically, processors are single instruction devices which serially decode the instructions and perform the specified function. Digital signal processors contain parallel functions and can perform several functions at one time. Still the problem exists to determine the route for many simultaneous incoming frames at one gigabit per second. Current fabric implementations perform routing on the order of tens of microseconds to hundreds of milliseconds. Ideally, routing should be accomplished in less than one microsecond.

Another problem with fabric realization is the support of the Arbitrated Loop topology. This topology has unique characteristics and requirements. Current fabric implementations do not support this topology.

Efficient support of both connection based classes of service (i.e., Class 1) and connectionless classes of service (i.e., Class 2 and 3) is also a challenge. A fabric must implement a different type of switch core to implement each class of service. Coordination between the different switch cores can be a burdensome task. Current fabric implementations support either a connection based or a connectionless switch core. This leads to inefficiencies, e.g., a connectionless switch core cannot switch Class 1 traffic if routes are not determined in frame time (i.e., less than one microsecond) and a connection switch core is very inefficient when routing Class 2 and Class 3 traffic.

Another problem with fabric realization is the interconnection or networking of fabrics. This is a problem due to the high speeds involved. Determining a network route is sometimes even more difficult than determining a local route. Destination addresses must be matched based not only on all bits matching but also matching a portion of the address. Route priorities should also be implemented to allow backup routes to a destination.

SUMMARY OF THE INVENTION

The present invention described and disclosed herein comprises a method and apparatus for transporting Fibre Channel frames between attached devices. The apparatus comprises logic which supports but is not limited to the following features: Transport of Class 1, Class 2 and Class 3 frames, Support for the Arbitrated Loop topology on each link, Support for Fabric point-to-point topology on each link, Route determination in frame arrival time, and Interconnection or Networking of Fabrics.

In one aspect of the invention, the apparatus comprises separate port control modules, one for each attached device, a central router module, a switch core module, a fabric control module and a brouter (bridge/router) module. In the preferred embodiment, the port control modules are connected to the router modules by separate route request connections and separate route response connections. Through this structure, route requests may be provided from the port control module to the router while simultaneously the router provides route request responses to the same port control module. Preferably, a common route request channel is utilized. Thus, apparatus is provided to return a route response to a previously requesting port while other ports are arbitrating and sending route requests to the centralized router. More generally, this apparatus provides for reading resource requests from multiple requesters while at the same time returning resource grant responses to previous requesters.

The router of the subject invention includes many advantageous aspects. In the preferred embodiment, the router includes multiple state machines arranged in series for pipeline operation. Specifically, in the preferred embodiment of the router, a hardware finite state machine operates on the route request and a hardware finite state machine provides the route response. Thus, in this embodiment, the router includes an input for receiving the output of the route request generator of the port control module, an output for sending a route request response to the route request response receiver in the port control module, a hardware finite state machine to receive the route request, and a hardware finite state machine to provide the route response, in combination with a route determination system. Through implementation in hardware, route responses may be made in less than two microseconds, which permits essentially real-time routing at gigahertz frequencies.

In yet another aspect of the router, it routes Fibre Channel frames to a destination port on the Fabric based on a selected portion of the incoming frame's destination address. In the preferred embodiment, Fibre Channel FCPH protocol rules are applied to an incoming frame to determine whether to route the frame or return a fabric reject or busy frames or to discard the frame. Validation of the routing of a Fibre Channel frame is based on the rules defined in the ANSI FCPH standards. In the preferred embodiment, route requests are serviced in a round robin manner from multiple ports.

In another embodiment an apparatus and method is provided to store blocked route requests until either the blocking condition resolves itself or a specified time period expires. Thus, a method for servicing route request from multiple attached devices where the routing is subject to blocked and unblocked conditions may be effective, where the method comprises the steps of servicing a route request which is not blocked, but saving a blocked route request in hardware, preferably in registers, and then servicing that request if the route changes from a blocked to an unblocked condition, in the preferred embodiment, prior to the expiration of a specified time period. In a more general sense, the invention manages the blocking and unblocking of multiple resource requests to a central resource.

In another embodiment an apparatus is provided to handle the scenario when a port input fifo is going to overflow with an incoming Fibre Channel frame. Generally, the incoming data stream is typically provided to an encoder/decoder, from which it is supplied to a buffer. In the event of a data overrun condition to the buffer, overrun prevention logic causes the setting of tag bits to a condition which may be recognized downstream as indicative of a buffer overflow condition.

In another embodiment an apparatus is provided to interleave accesses by the processor on the outgoing port bus in between outgoing frames or when the output fifo is full.

In another embodiment an apparatus is provided to pack requests in a register array in order of first arrival but allow the removal of the requests from anywhere in the array.

OBJECTS OF THE INVENTION

It is an object of this invention to provide a fibre channel fabric capable of operating at least 1 gigabit speeds.

It is yet a further object of this invention to permit the establishment of a path through a fabric in real time at gigabit speeds.

It is yet a further object of this invention to provide 1 microsecond or less response time to fibre channel frames.

It is another object of this invention to determine in real time at gigabit speeds that no through path can be established through the fabric.

It is yet another object of this invention to provide a fibre channel fabric capable of simultaneously supporting Class 1, Class 2 and Class 3 service.

It is an object of this invention to provide a fibre channel switching fabric which supports arbitrated loop topology.

It is yet another object of this invention to provide systems and methods adapted for interconnection of multiple fabrics.

It is yet another object of this invention to provide a system which supports Fabric point-to-point topology on each link.

BRIEF DESCRIPTION OF THE DRAWINGS

FIG. 1 is a diagram illustrating the use of a Fibre Channel Fabric.

FIG. 2 is a block diagram of a Fibre Channel Fabric.

FIG. 4 is a block diagram of the fabric Router.

FIG. 1 is a diagram of the main Control FSM.

FIG. 16 is another detailed diagram of the Route Request Unblock Determination module circuit.

FIG. 24 is a diagram of the Port Control Route Request Interface module.

FIG. 25 is a diagram of the Port Control Route Response Interface module.

DETAILED DESCRIPTION OF THE INVENTION

Table of Contents

Figure 3:
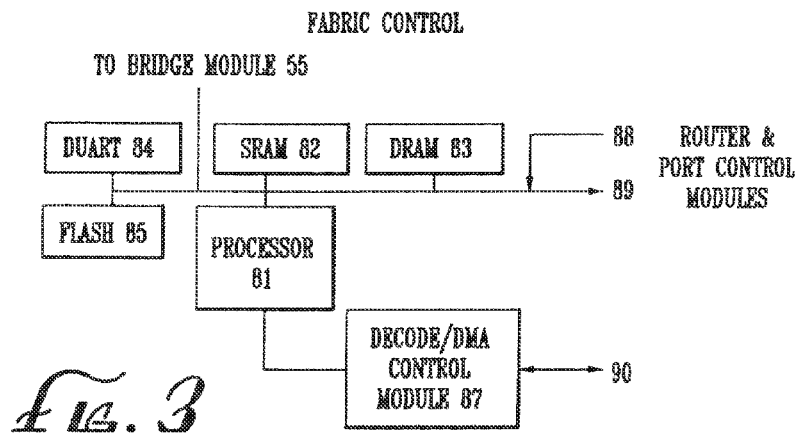
FIG. 3 is a block diagram of the Fabric Control module.
Figure 12:
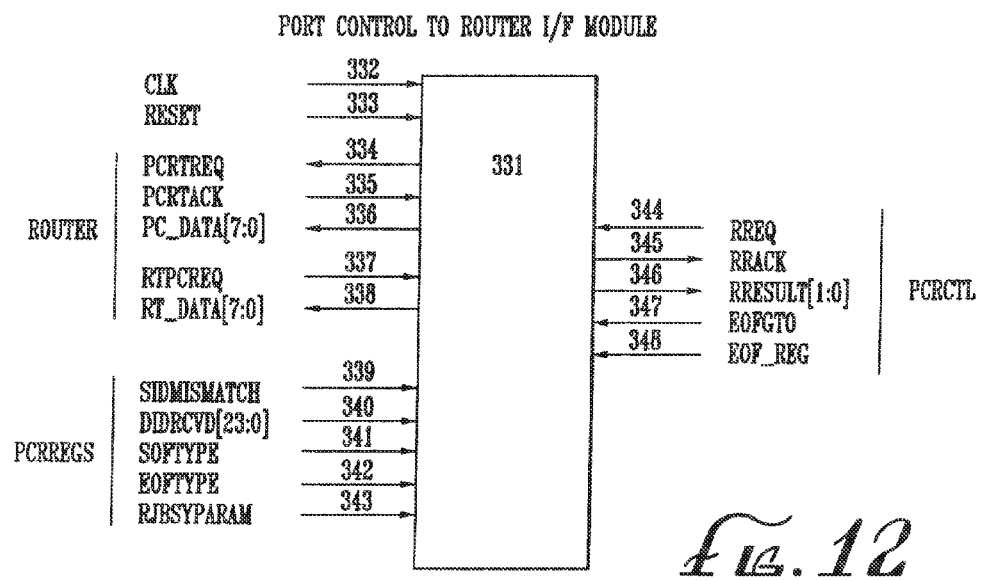
FIG. 12 is a diagram of the Control PCFIFO module interface signals.

A. Definitions
B. Fibre Channel Fabric Model
C. Fabric Control Module
D. Fabric Router
  1. Port Control Route Request Interface Module
  2. Port Control Route Response Interface Module
  3. Address Table
  4. Address Match Module
  5. Blocked Route Request Table
  6. Blocked Route Request Port Register Array
  7. Blocked Route Request Timer
  8. Route Request Unblock Determination Module
  9. Route Request Selector
  10. Route Determination Module
  11. Route State Table
  12. Router Statistics Gathering Module
  13. Router Control FSNM
E. Port Control
  1. Port Control Module
  2. FIFO Overrun Prevention Logic
  3. Processor/Data Arbitration Logic
  4. Port Control Hub Module
F. Switch Core
G. Router Module
H. Other Documents

A. Definitions

For expository convenience, the present invention is referred to as the Fibre Channel Fabric or Fabric, the lexicon being devoid of a succinct descriptive name for a system of the type hereinafter described.

The "Fibre Channel ANSI standard" describes the physical interface, transmission protocol and signaling protocol of a high-performance serial link for support of the higher level protocols associated with HIPPI, IPI, SCSI, IP, ATM and others.

The "Fibre Channel Fabric" comprises hardware and software that switches Fibre Channel frames between attached devices at speeds up to one gigabit per second.

The following discussions will be made clearer by a brief review of the relevant terminology as it is typically (but not exclusively) used.

"Fibre Channel" is an American National Standard for Information Systems (ANSI) standard which defines a high performance serial link for support of the higher level protocols associated with HIPPI, IPI, SCSI, IP, ATM, FDDI and others.

"FC-1" defines the Fibre Channel transmission protocol which includes the serial encoding, decoding, and error control.

"FC-2" defines the signaling protocol which includes the frame structure and byte sequences.

"FC-3" defines a set of services which are common across multiple ports of a node.

"FC-4" is the highest level in the Fibre Channel standards set. It defines the mapping between the lower levels of the Fibre Channel and the IPI and SCSI command sets, the HIPPI data framing, IP, and other Upper Level Protocols (ULPs).

"Fibre" is a general term used to cover all transmission media specified in the ANSI X3.230 "Fibre Channel Physical and Signaling Interface (FC-PH)" standard.

A "fabric" is an entity which interconnects various N_Ports attached to it and is capable of routing frames by using only the D_ID information in the FC-2 frame header. The word Fabric can be seen as a synonym with the word switch or router.

"Fabric topology" is a topology that uses the Destination Identifier (D_ID) embedded in the Frame Header to route the frame through a Fabric to the desired destination N_Port.

"Point-to-point topology" allows communication between N_Ports without the use of a Fabric.

A "circuit" is a bidirectional path that allows communication between two L_Ports.

"Arbitrated Loop topology" permits three or more L_Ports to using arbitration to establish a point-to-point circuit. When two L_Ports are communicating, the arbitrated loop topology supports simultaneous, symmetrical bidirectional flow.

"Link Control Facility" is a facility which attaches to an end of a link and manages transmission and reception of data. It is contained within each Port type.

"Port" is a generic reference to an N_Port or F_Port.

An "N_Port" is a hardware entity which includes a Link Control Facility.

An "NL_Port" is an N_Port that contains Arbitrated Loop functions associated with Arbitrated Loop topology.

An "F_Port" is a generic reference to an F_Port or FL_Port.

An "FL_Port" is an F_Port that contains Arbitrated Loop functions associated with Arbitrated Loop topology.

An "L_Port" is an N_Port or F_Port that contains Arbitrated Loop functions associated with Arbitrated Loop topology.

A "Node" is a collection of one or more N_Ports controlled by a level above FC-2.

A "dedicated connection" is a communicating circuit guaranteed and retained by the Fabric for two given N_Ports.

A "connection" is the process of creating a Dedicated Connection between two N_Ports.

A "disconnection" is the process of removing a Dedicated Connection between two N_Ports.

A "frame" is an indivisible unit of information used by FC-2.

"Frame content" is the information contained in a frame between its Start-of-Frame and End-of-Frame delimiters, excluding the delimiters.

A "data frame" is a frame containing information meant for FC-4/ULP or the Link application.

"Payload" is the contents of the Data Field of a frame, excluding Optional Headers and fill bytes, if present.

"Source identifier" or S_ID is the address identifier used to indicate the source Port of the transmitted frame.

"Destination Identifier" or D_ID is the address identifier used to indicate the targeted destination of the transmitted frame.

"Valid frame" is a frame received with a valid Start of Frame (SOF), a valid End of Frame (EOF), valid Data Characters, and proper Cyclic Redundancy Check (CRC) of the Frame Header and Data Field.

"Classes of Service" are different types of services provided by the Fabric and used by the communicating N_Ports.

"Class 1" service is a service which establishes a dedicated connection between communicating N_Ports.

"Class 2" service is a service which multiplexes frames at frame boundaries to or from one or more N_Ports with acknowledgement provided.

"Class 3" service is a service which multiplexes frames at frame boundaries to or from one or more N_Ports without acknowledgement.

"Intermix" is a service which interleaves Class 2 and Class 3 frames on an established Class 1 connection.

A "Gigabit Link Module" is a module which interfaces to the Endec through either a 10-bit or 20-bit interface and interfaces to the Fibre Channel link through either a copper or fiber interface.

An "Encoder/Decoder" or Endec is a device which implements the FC-1 layer protocol.

A "Router" is a module which determines the destination port from an address and other Fibre Channel frame parameters.

A "Port Control" is a module which reads in a Fibre Channel header, requests a route and forwards the frame to the switch core.

"Credit" is the login credit which represents the number of frames that may be transmitted before receiving an acknowledgement or R_RDY.

"Fabric Login Protocol" is when an N_Port interchanges Service Parameters with the Fabric by explicitly performing the Fabric Login protocol or implicitly through an equivalent method not defined in FC-PH.

"Application Specific Integrated Circuit" or (ASIC), an integrated circuit designed to perform a particular function by defining the interconnection of a set of basic circuit building blocks drawn from a library provided by the circuit manufacturer.

"FPGA" Field Programmable Gate Array, a gate array where the logic network can be programmed into the device after its manufacture. An FPGA consists of an array of logic elements, either gates or lookup table RAMs, flip-flops and programmable interconnect wiring. Most FPGAs are dynamically reprogrammable, since their logic functions and interconnect are defined by RAM cells.

"FIFO" a data structure or hardware buffer from which items are taken out in the same order they were put in.

"Bridge" a device which forwards traffic between network segments based on datalink layer information. These segments would have a common network layer address.

"Router" a device which forwards traffic between networks. The forwarding decision is based on network layer information and routing tables, often constructed by routing protocols.

"Brouter" a device which bridges some packets (i.e. forwards based on datalink layer information) and routes other packets (i.e. forwards based on network layer information). The bridge/route decision is based on configuration information.

"Hub" a device connecting several other devices.

"Serdes" serial encoder/decoder, converts the Fibre Channel serial interface to/from a 10 or 20 bit parallel interface.

"HIPPI" is a computer bus for use over fairly short distances at speeds of 800 and 1600 megabytes per second. HIPPI is described by the ANSI standard X3T9/88-127.

"SCSI" or Small Computer System interface is a standard for system-level interfacing between a computer and intelligent devices including hard disks, tape drives, and many more. SCSI is described by the ANSI standard X3.131-1986 and by ISO/IEC 9316.

"ATM" or Asynchronous Transfer Mode is a method for the dynamic allocation of bandwidth using a fixed-size packet, also called a cell.

"SNMP" or Simple Network Management Protocol is an Internet Standard protocol defined in RFC 1157, developed to manage nodes on an IP network.

"MIB" or management information base is a database of managed objects accessed by network management protocols such as SNMP.

"Web" is the World-Wide Web, an Internet client-server distributed information retrieval system which originated from the CERN High-Energy Physics Laboratories in Geneva, Switzerland.

"Web Browser" is a program which allows a person to read information from the Web. The browser gives some means of viewing the contents of nodes (or "pages") and of navigating from one node to another.

B. Fibre Channel Fabric Model

Referring to FIG. 1, a Fibre Channel Fabric is an entity which transports Fibre Channel frames between attached devices. The data transmission between the connected device port (i.e., N_Port) and the Fabric port (i.e., F_Port) is serial and consists of one or more frames. The transmission protocol and speeds along with the fabric functionality are defined in the American National Standard for Information Systems (ANSI) FCPH standard (see Other documents, section H, below).

The primary function of the Fabric is to receive frames from a source N_Port and route the frames to the destination N_Port whose address identifier is specified in the frames. Each N_Port is physically attached through a link to the Fabric or in the case of an Arbitrated Loop topology attached to the same loop. FC-2 specifies the protocol between the Fabric and the attached N_Ports. A Fabric is characterized by a single address space in which every N_Port has a unique N_Port identifier.

The Fabric model contains three or more F_Ports or FL_Ports. Each F_Port is attached to an N_Port through a link. Each F_Port is bidirectional and supports one or more communication models. The receiving F_Port responds to the sending N_Port according to the FC-2 protocol. The Fabric optionally verifies the validity of the frame as it passes through the Fabric. The Fabric routes the frame to the F_Port directly attached to the destination N_Port based on the N_Port identifier (D_ID) embedded in the frame. The address translation and the routing mechanisms within the Fabric are transparent to N_Ports.

There are two Sub-Fabric models, a Connection based model and a Connectionless based model. The Connection based Sub-Fabric provides Dedicated Connections between F_Ports and the N_Ports attached to these F_Ports. A Dedicated Connection is retained until a removal request is received from one of the communicating N_Ports or an exception condition occurs which causes the Fabric to remove the Connection. The Connection based Sub-Fabric is not involved in flow control which is managed end-to-end by the N_Ports. If the Fabric is unable to establish a Dedicated Connection, it returns a busy or reject frame with a reason code.

A Connectionless Sub-Fabric is characterized by the absence of Dedicated Connections. The Connectionless Sub-Fabric multiplexes frames at frame boundaries between an F_Port and any other F_Port and between the N_Ports attached to them.

A given frame flows through the Connectionless Sub-Fabric for the duration of the routing. After the frame is routed, the Connectionless Sub-Fabric is not required to have memory of source, routing or destination of the frame. When frames from multiple N_Ports are targeted for the same destination N_Port in Class 2 or Class 3, congestion of frames may occur within the Fabric. Management of this congestion is part of the Connectionless Sub-Fabric and buffer-to-buffer flow control.

FIG. 1 shows a possible environment containing a Fibre Channel fabric. The fabric 1, 2 illustrated are connected with a mix of workstations 3, disk arrays 4, mainframe computers 5, and Personal Computers (PC) 6. Fabric interconnection is not limited to particular equipment or a network topology as illustrated in FIG. 1. Two types of fabric topologies are illustrated in FIG. 1, the direct fabric attached topology 9 and the arbitrated loop topology 7.

The fabrics in FIG. 1 are shown interconnected or networked through a link 8. All links to the fabric can operate at either 266 Mbps, 533 Mbps or 1.063 Gbps speeds and operate over either copper or fiber media, or any other compatible media.

FIG. 2 shows a block diagram of the fabric. The fabric is composed of a fabric control module 54, a router module 52, multiple port control modules 51, 74, 75 a switch core module 53 and optionally one or more brouter modules 55. As is understood in the art, the functions allocated to these respective devices may, in alternate embodiments, be allocated to different logical blocks.

The fabric control module 54 contains a processor and associated hardware. The fabric control module software performs but is not limited to the following functions: (1) Fabric power on self test, (2) Fabric configuration, (3) Broadcast, Simple Name, ARP and Directory services servers, (4) Fabric Loop Attached profile Extended link service command, (5) Management, (6) Network Management SNMP agent, (7) Web based fabric management, (8) Uninterruptable power supply monitoring and control, and (9) Brouter Module Configuration/Control. The Fabric Control module controls and configures the rest of the fabric but is not usually involved in the normal routing of frames.

The fabric Router 52 performs some or all of the following functions: (1) route address matching, (2) route determination based on the ANSI X3T11 rules, (3) route request blocking and unblocking, (4) switch core programming 63, (5) statistics collection and (6) port control module route request/response handling 59, 60, 61, 62, 66, 67, 72, 73.

The fabric Port Control modules (PCM) 51, 70, 74, 75 perform some or all of the following functions: (1) receive Fibre Channel frames from the fiber or copper media 56, 77, 78, (2) perform frame validation, (3) send a route request to the router 59, 61, 66, 72, (4) receives a route response from the router 60, 62, 63, 67, 73, (4) forwards the frame to the switch core 57, 69, and (5) either discards the frame, modifies the frame into a fabric reject (F_RJT) or fabric busy (F_BSY) frame or forwards the frame depending on the route response from the router.

The fabric switch core 53 is a nonblocking N×N matrix switch with 36 bit wide transmit and receive I/Os. The switch core switches frames from the PCMs 51, 70, 74, 75 to the destination PCMs or Brouter Module.

The Brouter Module 55 performs some or all of the following functions: protocol bridging and/or routing function between a Fibre Channel network and the network implemented by the Brouter Module. The Brouter Module "looks" like a Fibre Channel port to the rest of the switch. This is due to a protocol conversion function in the Brouter Module which converts the brouter networked frames to Fibre Channel frames. Converted Fibre Channel frames from the Brouter Module enter the fabric switch through an internal port control module 70. Fibre Channel frames from the fabric switch core enter the Brouter Module through an internal path 76.

C. Fabric Control Module

FIG. 2 shows the Fabric Control module (FCM) 54. The FCM 54 serves some or all of the following functions: configures the fabric, collects and reports network management parameters and implements the fabric defined servers such as the Simple Name Server, Directory Services, etc. The FCM 54 configures the router 52, the port control modules 51, 74, 75 and the brouter module 55.

FIG. 3 shows the Fabric Control module (FCM) in more detail. The FCM is made up preferably of fast SRAM 82, DRAM 83, a DUART 84, flash memory 85 (nonvolatile storage), a processor 81 and a Decode/DMA Control module 87. The code for the processor is contained in the flash memory 85 and is copied to SRAM upon bootup. The interface to the brouter module 55 allows the FCM to communicate through legacy networks such as ethernet and fast ethernet, depending on the brouter module.

The FCM is attached to the rest of the fabric in two different manners: both in-band 80 to the fabric and out of band 79 to the fabric. The in-band connection is through the internal port control module. This connection allows the Fabric Control Module to communicate with both locally and remotely attached Fibre Channel compliant devices via Fibre Channel frames. The FCM connects out of band to the rest of the system for monitoring, initialization and control reasons.

D. Fabric Router

The Fabric Router 52 (FIG. 2) receives route requests generated from the Port Control modules 59, 61, 66, 72, determines the frame route, reports the route responses to the Port Control modules 60, 62, 67, 73, programs the switch core to connect and disconnect the routes 63, manages blocked route requests and collects the routing statistics. In the preferred embodiment, there is one central router contained in a fabric. The Router 52 connects and disconnects routes on a frame by frame basis. Since the router can determine a route in real time (i.e., Fibre Channel frame time) the Fabric can support Class 1 frames. The router is realized in hardware through either an FPGA or a custom ASIC. The router is composed of thirteen functional modules as illustrated in FIG. 4:

(1) Port Control Route Request Interface (PCRRIM) 130
(2) Port Control Route Response Interface (PCRSPM) 144
(3) Address Table 132
(4) Address Match Module (ADM) 131
(5) Blocked Route Request Table Module (BRTBL) 133
(6) Blocked Route Request Port Register Array (BRRA) 134
(7) Blocked Route Request Timer (BRTMR) 135
(8) Route Request Unblock Determination Module (RRUNB) 136
(9) Route Request Selector (RRS) 137
(10) Route Determination Module (RDM) 138
(11) Route State Table (RST) 139
(12) Router Statistics Gathering Module (RST) 141
(13) Router Control FSM (RCFSM) 140.

1. Port Control Route Request Interface Module (PCRRIM)

Figure 31:
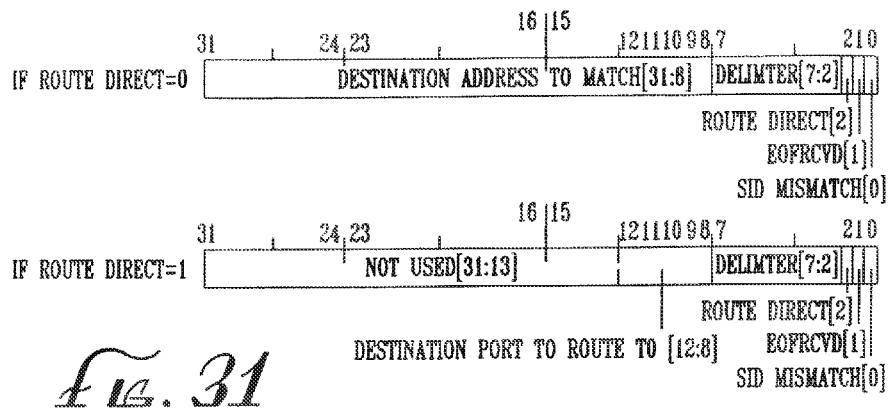
FIG. 31 is a diagram of the format of the Route Request.

The Port Control Route Request Interface Module (PCRRIM) 130 of FIG. 4 (and FIG. 24 numeral 581) interfaces with the PCMs (51, 74, 75 of FIG. 2) to read route requests and registers the route request for use by the internal router modules. The PCRRIM FIG. 24 is composed of the following functional blocks: round-robin arbitration 582, route request state machine 583, registered route request 584, and the port winning arbitration register 585. The PCRRIM 581 is connected to each PCM (items 56, 77 and 78 of FIG. 4) through a separate PCM requester signal 586. The PCRRIM 581 is also connected to each PCM through a common shared route request data channel 588. After a PCM captures an incoming frame and builds a route request the PCM raises the PCM route request signal 586. The PCRRIM round robin arbitration block 582 will read all request signals and choose the requester in a round robin manner. This implements requester fairness, i.e., one requester will not be able to starve other concurrent PCM requesters. The round robin arbitration block 582 will notify the winning PCM requester via the route request state machine 583 by pulsing for one clock period the PCM acknowledge signal 587 back to the winning PCM. During the next four clocks the PCM sends the route request over the common route request channel 588 to the registered route request block 584. The Route Request channel is implemented as an eight bit bus, but is not restricted to that size. The route request is thirty two bits and is shown in FIG. 31. The signals are described below.

| Route Request Field | Description |
| --- | --- |
| SID Mismatch | Indicates that the incoming frame SID does not match the expected SID |
| EOFrcvd | Indicates that the entire frame including the EOF was received |
| Route Direct | A flag to override the router address matching logic. This is used to route frames from the fabric control module out to a specific port without the use of the DID field |
| Delimiter | Is an encoded field which specifies the received frames delimiter |
| Destination Address | The DID from the incoming frame. This field is valid only when the route direct flag is not set. |
| Destination port to route to | Only valid when the route direct flag is set, indicates the remote port to route the frame to. |

The winning PCM port number is registered 585 (FIG. 24) and held for use by the internal router modules 589. The PCRRIM is controlled by the Router Control FSM through the request serviced signal 591. The PCRRIM will raise the request valid signal 590 whenever it has a valid route request from a PCM in its register 584. The PCRRIM will halt any further route request reads from the PCM until the request serviced signal 591 is pulsed for one clock period by the Router Control FSM.

Figure 26:
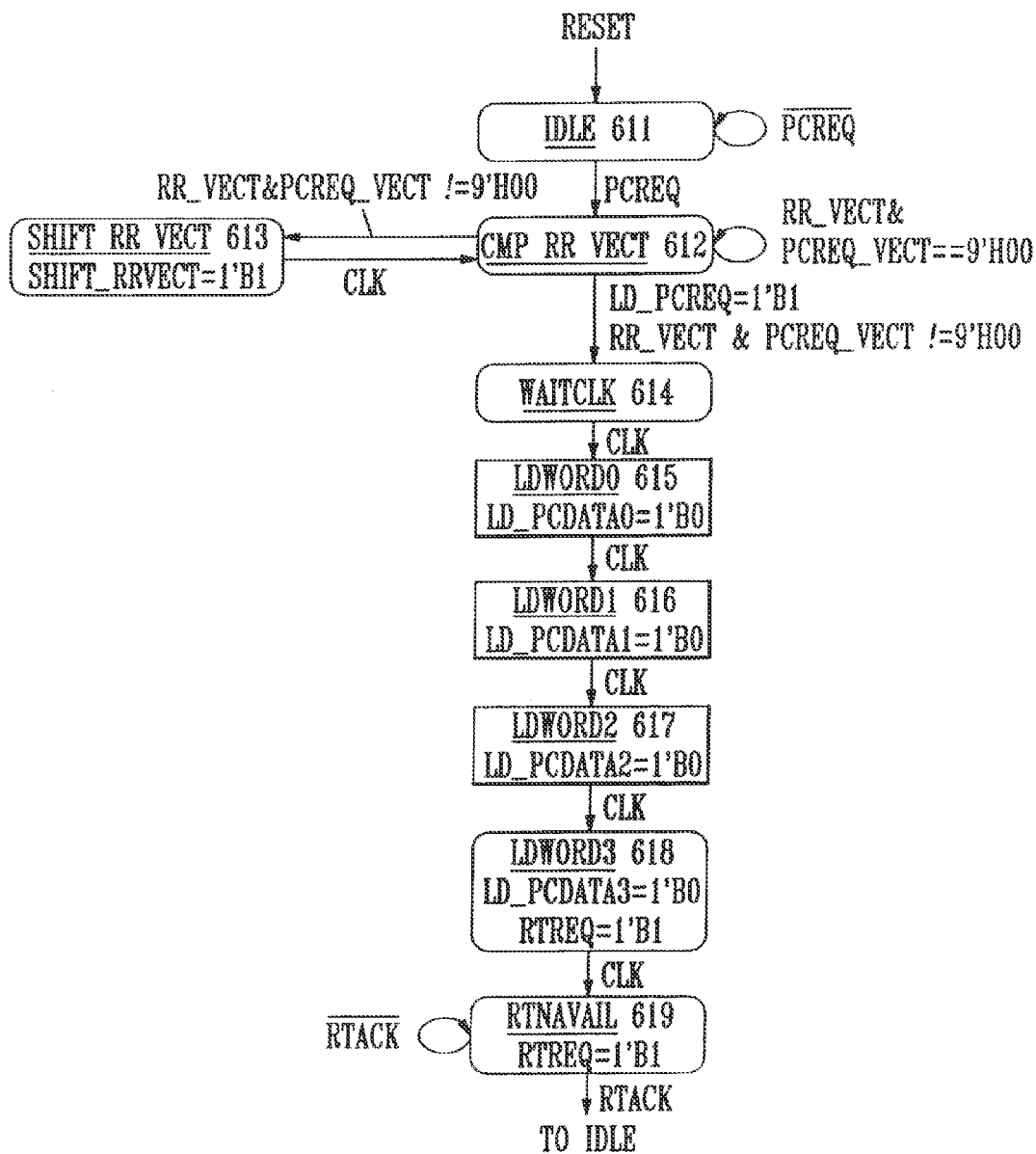
FIG. 26 is a diagram of the Router to Port Control Route Request State Machine.

FIG. 26 shows the PCRRIM state machine. The state machine is described below.

| State | Description |
| --- | --- |
| IDLE 611 | Wait for a route request from a port control |
| CMP_RR_VECT 612 | Route robin logic, compare the current select vector with the port control. If a match occurs the port control is currently requesting a route. |
| SHIRT_RR_VECT 613 | Shift the current select vector. |
| WAITCLK 614 | Signal the select port control module, wait one clock before reading the route request channel for the route request. |
| LDWORD0, 1, 2, 3 615, 616, 617, 618 | Read the route request from the route request channel. Since the route request channel is 8 bits wide and the route request is thirty two bits, four clocks are needed to read the route request. |
| RTNAVAIL 619 | Wait until the Main Route Control FSM signals that the route request is no longer needed (RTACK) then return to idle and wait for another route request from the port control modules. |

2. Port Control Route Response Interface Module (PCRSPM)

As shown in FIG. 4 the Port Control Route Response Interface Module (PCRSPM) 144 interfaces with all the PCMs 114, the Route Determination module 138 and the Router Control FSM module 140. The PCRSPM main function is to return route responses to the PCMs 114. The PCRSPM 144 is independent of the PCRRIM 101 which enables the router 52 to concurrently receive route requests and send route responses. This separation in function adds parallelism to the router, permits pipelined operation of the router and increases its performance.

Figure 32:
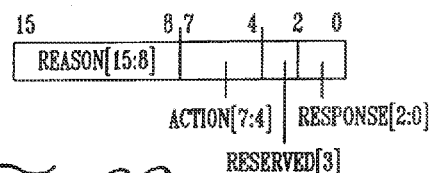
FIG. 32 is a diagram of the format of the Router to Port Control Response.

As shown in FIG. 25 the PCRSPM is preferably composed of the following functional blocks: the route response state machine 602 and the route response register 603. The PCRSPM registers the route response 608 from the Route Determination module when the load route response signal 607 is pulsed for one clock period by the Router Control FSM 140 (FIG. 4). When the Router Control FSM 140 pulses the send route response signal 606 the route response state machine 602 will inform the PCM corresponding to the port vector 609 by pulsing the PCM response acknowledgement signal 604 and putting the route response on the common route response channel 605 for the next four clocks. FIG. 32 shows the thirty two bit route response format. An eight bit common route response channel is shown but a thirty two bit wide channel can be used depending on the implementation.

Figure 27:
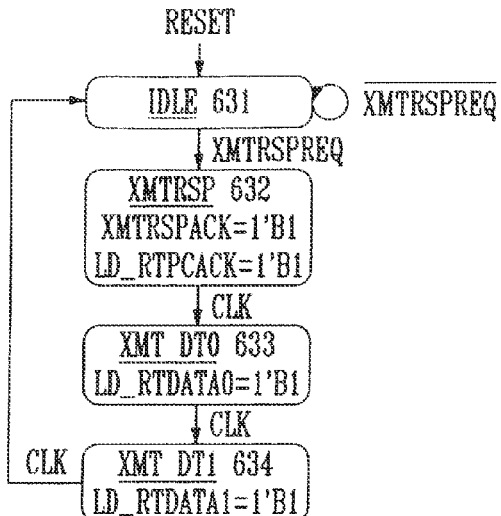
FIG. 27 is a diagram of the Router to Port Control Route Response State Machine.

FIG. 27 shows the PCRSPM state machine (item 602 of FIG. 25). The state machine is described below.

| State | Description |
| --- | --- |
| IDLE 631 | Wait for main Router Control FSM to assert the return route response signal. |
| XMTRSP 632 | Acknowledge the main Router Control FSM that the route response will be returned. Signal the specific port control module the route response will be on the route response data channel on the next two clocks. |

| State | Description |
|---|---|
| XMT_DT0 633 | Load the first eight bits of the route response on the route response data channel. |
| XMT_DT1 634 | Load the second eight bits of the route response on the route response data channel, return to IDLE. |

3. Address Table

Figure 33:
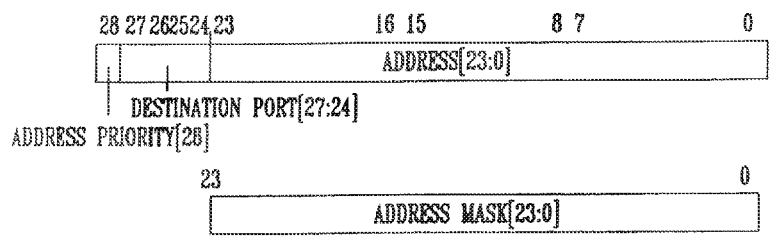
FIG. 33 is a diagram of the format of the Address Table entry.

The Address Table 132 of FIG. 4 is initially configured by the processor in the fabric control module 122. The Address Table 132 contains entries against which the incoming Fibre Channel frame destination identifier (D_ID) is compared. FIG. 33 shows the preferred address table entry format. The address entry contains a twenty four bit address mask register along with a twenty four bit address register. The incoming D_ID is ANDed with the address mask register and the result is compared to the address register. This allows a match to be performed on any number of bits in the address. This also implements routing based on any combination of the address domain (upper eight bits of the address field), area (middle eight bits of the address field) or port (lower eight bits of the address field) fields. Additional address fields include the destination port and the address priority fields. The destination port indicates which remote F_Port to route the frame to and the address priority field specifies a priority for this address table entry match. For any two address matches the address table entry match which is the highest priority will be used. This implements an alternate routing in case of port failure.

4. Address Match Module (ADM)

Figure 13:
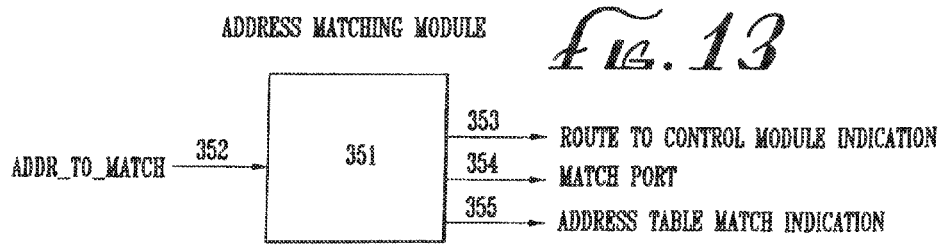
FIG. 13 is a diagram of the Router address matching module.

The Address Match module 13 (ADM) in FIG. 4 (FIG. 13 numeral 351) performs the comparison with the incoming frame D_ID address from the route request 105 with the Address Table contents 109. The results are used by the Route determination module 138. As shown in FIG. 13 the ADM 351 has as an input the twenty-four bit address to match 352, i.e., the incoming frame D_ID address from the route request, and returns the following responses: the remote match port 354, the address matched indication 355 and the route to control module indication 353. The ADM will match an incoming D_ID address to all the addresses in the address table in one clock. The ADM logic is implemented in combinatorial logic. The ADM performs the following checks for each address table entry:

Address Match indication=(address in table==(address mask & D_{ID}))

The results are then priority decoded based on address priority contained in the address table and the resulting address match signal and port are generated. There is one special mode which is implemented which will preemptively route all frames to the Fabric Control module except frames originating from the Fabric Control module. This allows the fabric control module to process all incoming frames which is useful when the fabric is functioning in certain environments.

5. Blocked Route Request Table (BRTBL)

Figure 30:
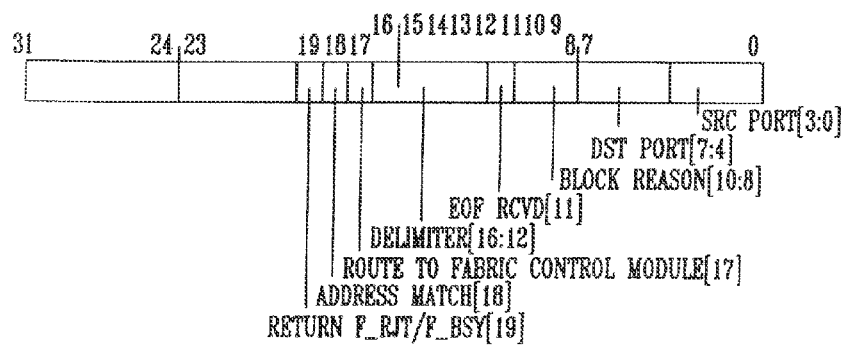
FIG. 30 is a diagram of the format of the Blocked Route Request Table entry.
Figure 28:
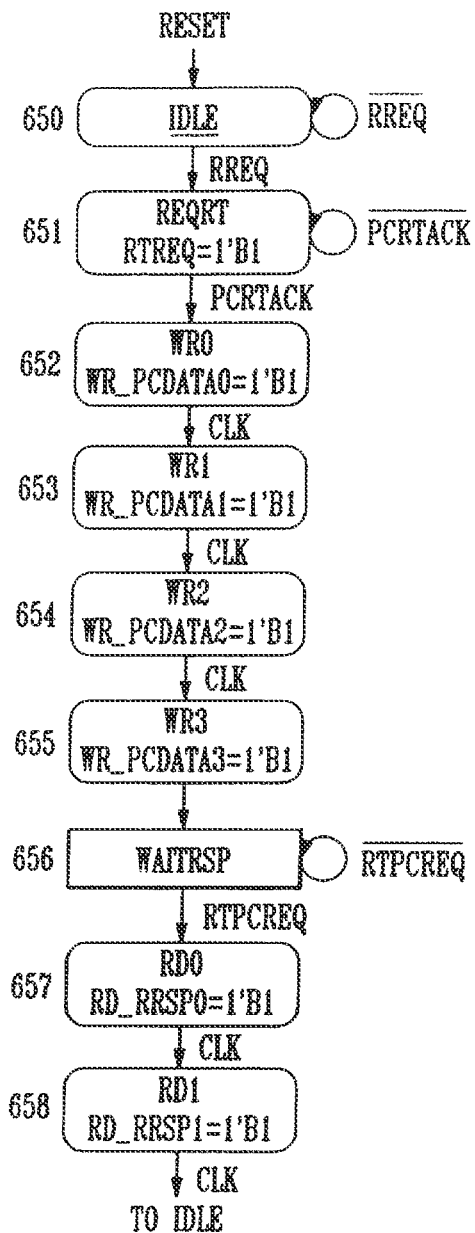
FIG. 28 is a diagram of the Port Control to Router Interface State Machine.

The Blocked Route Request Table 133 (BRTBL) in FIG. 4 functions to save blocked route requests. Preferably, it is realized by an array of registers. The BRTBL saves enough information to regenerate the route request once the blocking condition is cleared. The format of the blocked route request is shown in FIG. 30. The blocked route request contains the requesting PCM port, the matched destination PCM port, the block reason, whether an EOF delimiter was received by the requesting PCM, i.e., whether the entire frame was received before the PCM requested a route, the delimiter in the incoming frame, i.e., SOF type, whether there was an address match, whether to route to the fabric control port and whether a fabric reject (F_RJT) or fabric busy (F_BSY) should be generated.

Figure 17:
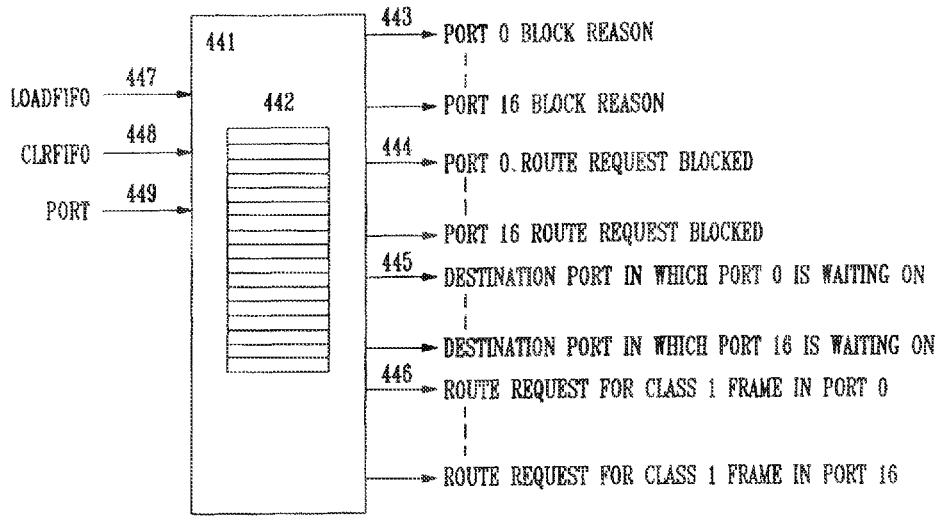
FIG. 17 is a diagram of the Blocked Route Request Table.

As shown in FIG. 4 the BRTBL reads the blocked route request from route request bus 107 when instructed to do so by the Route Control FSM 140. As shown in FIG. 17 a blocked route request is loaded upon a LOADFIFO 447 signal pulse by the Router Control FSM. Blocked route requests are cleared when the CLRFIFO 448 signal is pulsed by the Router Control FSM. The port input vector, 449, selects which port location in the table to load or clear the blocked route request. There is one blocked route request entry for each PCM and the blocked route request is registered so certain fields are available FIG. 4 numeral 116 to the Route Request Unblock Determination module FIG. 4 numeral 136. As shown in FIG. 17, the BRTBL 441 contains the registered blocked route request table 442 so certain fields in the blocked route request can be monitored by other router internal modules, 443, 444, 445, 446. The signals which are monitored include whether the specific entry contains a blocked route request 444, the block reason 443 which includes blocked due to the remote port busy or blocked due to the remote port in a class 1 connection with a port other than this one, and intermix is not support by the remote port. Other monitored fields include whether the blocked request frame is a Class 1 frame as indicated by the SOF delimiter.

6. Blocked Route Request Port Register Array (BRRA)

Figure 19:
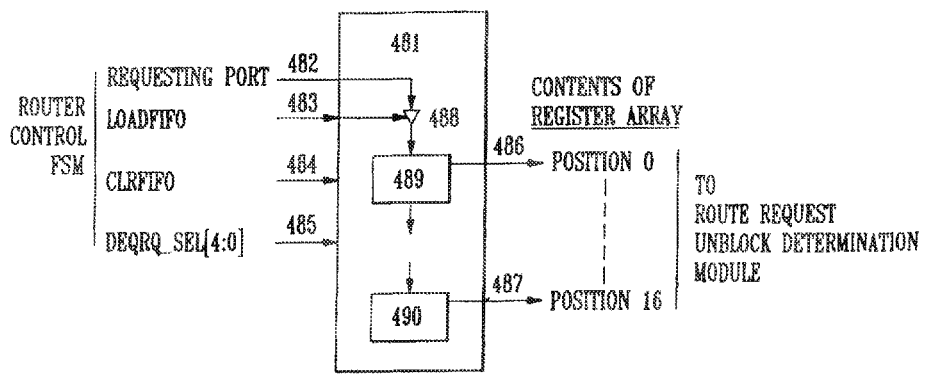
FIG. 19 is a diagram of the Blocked Route Request Port Register Array.

The Blocked Route Request Port Register Array 134 (BRRA) in FIG. 4 reads in the requesting port 103 and saves it into a register array which keeps the PCM request order. This order is wired 118 to the Route Request Unblock Determination module 136. The BRRA is shown in in more detail in FIG. 19. When the LOADFIFO 483 signal from the Router Control FSM is pulsed for one clock period the requesting PCM port 482 is saved into position 0 numeral 489 of the register array. Register array entries are removed by the Route Request Unblock Determination module through the CLR-FIFO 488 signal and DEQRQ_SEL 485 vector, i.e., when the CLRFIFO signal is pulsed for one clock period the BRRA will unload the register specified by the DEQRQ_SEL vector.

Position 0 numeral 489 contains the newest route request and position 16 numeral 490 contains the oldest route request. Register array contents are shifted by one, from the newest position to the oldest, when the LOADFIFO signal is pulsed to make room for the newest blocked route request port number. The shifting circuit must take into account 'holes' in the register array. The algorithm identifies the first free register array entry closest to position 0 and shifts all the entries from position 0 to the free register array entry. The shifting circuit creates a shift vector (STTMP) which is used to load the contents of the individual register array entries. The circuit is shown below in verilog for eight ports.

```
always @(F1_NULL or F2_NULL or F3_NULL or F4_NULL or
F5_NULL or F6_NULL or F7_NULL or F8_NULL) begin
  // build fifo shift control word (indicates how to shift fifo)
  casex ({F8_NULL, F7_NULL, F6_NULL, F5_NULL,
      F4_NULL, F3_NULL, F2_NULL, F1_NULL})
    8'b1xxxxxxx: STTMP = 8'b11111111;
    8'b01xxxxxx: STTMP = 8'b01111111;
    8'b001xxxxx: STTMP = 8'b00111111;
    8'b0001xxxx: STTMP = 8'b00011111;
    8'b00001xxx: STTMP = 8'b00001111;
    8'b000001xx: STTMP = 8'b00000111;
    8'b0000001x: STTMP = 8'b00000011;
    8'b00000001: STTMP = 8'b00000001;
```

-continued

```
    default: STTMP = 8'b00000000;
  endcase
end // always
where F1_NULL, ...., F8_NULL are true if register array position 1 to 8
(respectively) are empty.
```

The shifting vector is then used with the CLRFIFO signal 484 and the dequeue port signal (DEQRQ_SEL) 485 to clear the register array contents.

```
    always @(posedge clk or negedge reset) begin
        if (!reset)      FIFO2 <= NULLVALUE;
        else if (LOADFIFO && STTMP[1])
                         FIFO2 <= FIFO1;
        else if (CLRFIFO && DEQRQ_SEL == FIFO2)
                         FIFO2 <= NULLVALUE;
        else             FIFO2 <= FIFO2;
    end
```

7. Blocked Route Request Timer (BRTMR)

The Blocked Route Request Timer 135 (BRTMR) in FIG. 4 implements one timer per PCM. The timer is enabled when a route request is blocked for the particular PCM. The timer is disabled when the blocked route request becomes unblocked. The BRTMR is controlled by the Route Control FSM which not only enables the timer but also indicates which timer to enable. Enabled timers are selected by the port from the incoming route request 104. Disabled timers are selected by the port from the route request selector module 146. The different timers are defined by the ANSI FCPH standard. When a timeout occurs the Route Request Unblock Determination module is signaled 119 to dequeue the blocked request as soon as possible.

8. Route Request Unblock Determination Module (RRUNB)

The Route Request Unblock Determination module 136 (RRUNB) in FIG. 4 determines when and which blocked route request to unblock. The RRUNB reads information from the Blocked Route Request Table 116, the Blocked Route Request Port Register Array 118 the Blocked Route Request Timer 119 and the Route State Table 124. A more detailed view of the RRUNB is shown in FIG. 14, FIG. 15 and FIG. 16.

Figure 14:
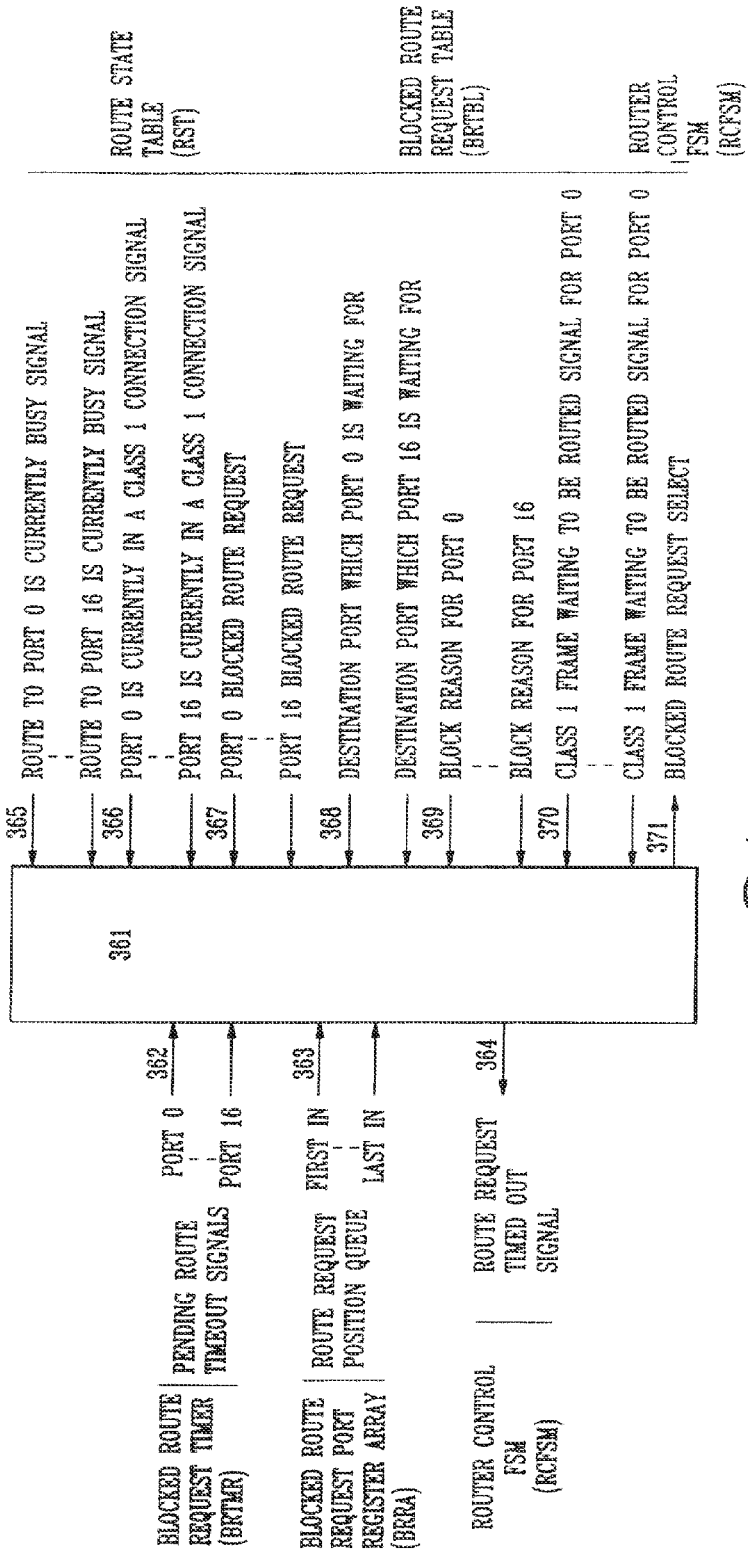
FIG. 14 is a diagram of the Router Route Request Unblock Determination module.

As shown in FIG. 14 the RRUNB 361 reads information from several internal router modules and determines the most recent and highest priority blocked route request to dequeue from the Blocked Route Request Table. The RRUNB signals the port to dequeue 371 to both the Blocked Route Request Table and the Router Control FSM. The inputs to the RRUNB include the following information from the Route State Table: Port is currently busy signal 365 and the Port is currently in a class 1 connection signal 366. The inputs to the RRUNB from the Blocked Route Request Table include the blocked route request indication, the destination port in which the blocked route request is waiting for, the block reason (whether waiting for the remote port to become free or both free and disconnected from a Class 1 route), and if the blocked route request is a Class 1 frame.

FIG. 16 shows part of the RRUNB circuit which generates intermediate terms necessary to calculate which blocked route requests to unblock. Each blocked route is waiting for certain conditions to clear from a destination port. The destination port vector 429, 431, 433, 435 is used to select which remote signal to look at 421, 422, 423, 424, to generate the remote status 430, 432, 434, 436. For example if a route request is blocked from port 1 the destination port which port 1 is waiting for is used to select the remote port busy signal. It is also used to select the "remote port is currently in a Class 1 connection signal".

Figure 15:
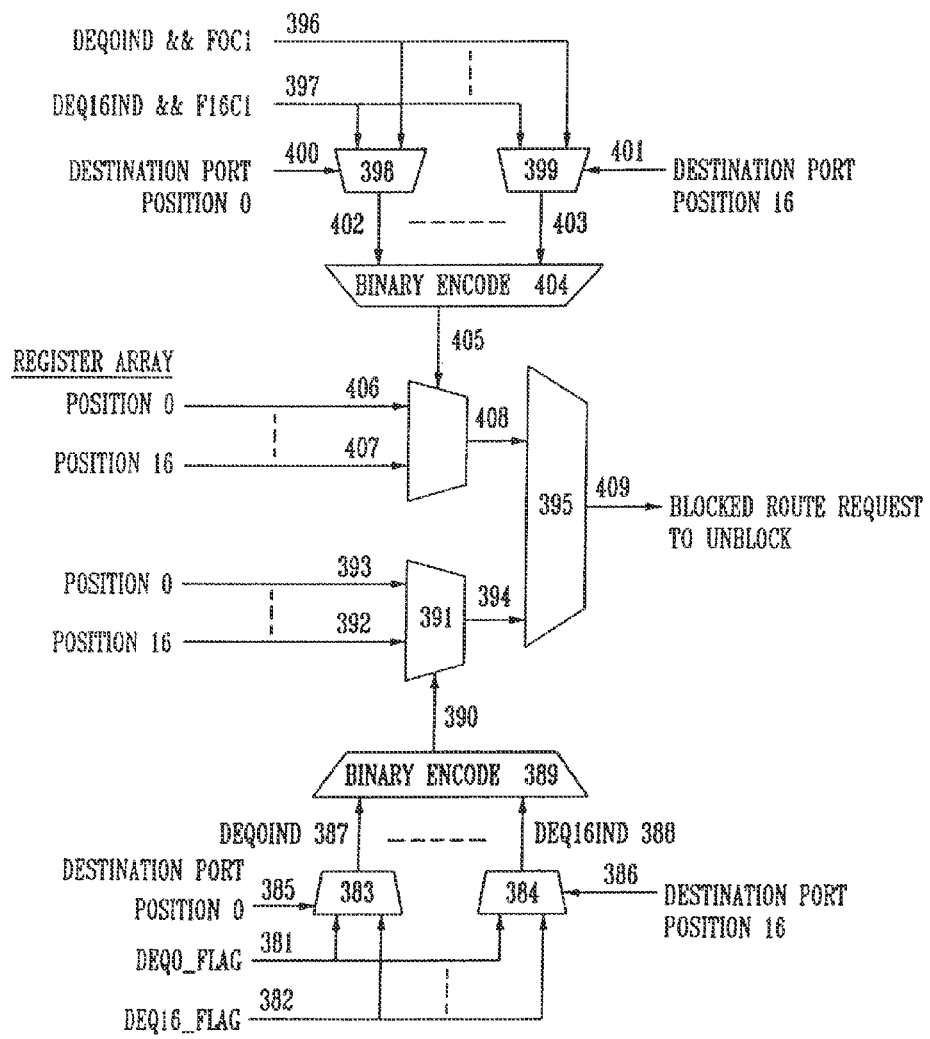
FIG. 15 is a detailed diagram of the Route Request Unblock Determination module circuit.
Figure 10:
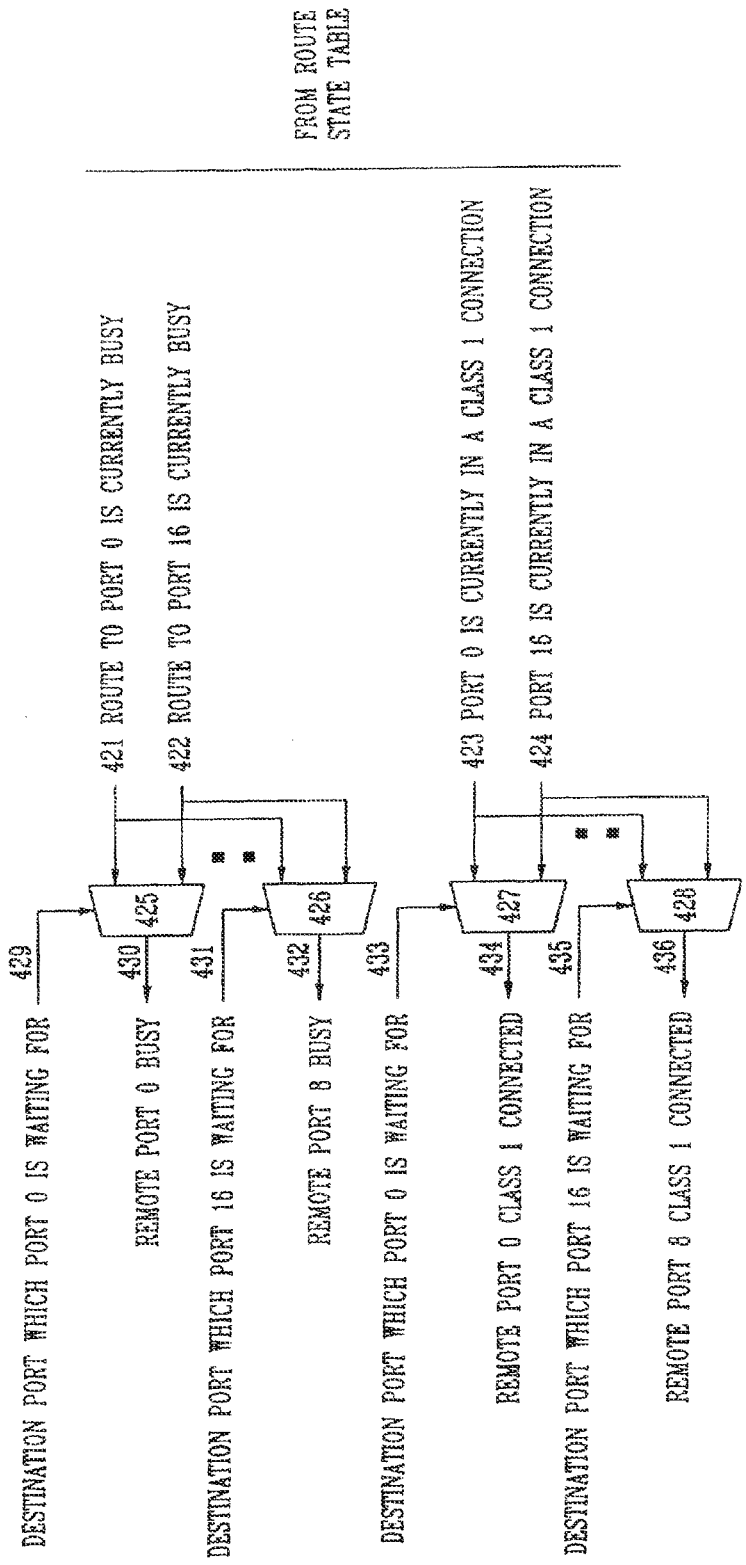

FIG. 15 shows another part of the RRUNB circuit. There are seventeen different DEQx_FLAGS, only two are shown for brevity, i.e., DEQ0_FLAG 381 and DEQ16_FLAG 382. The DEQx_FLAG signals are generated according to the following circuit:

```
DEQO_FLAG = Timeout indication for port 0 from RTMR ||
    ((!(remote port 0 busy) &&
    (!(block reason == wait for remote port 0 Class 1 connected &&
    (remote port 0 Class 1 connected))))
```

The timeout indication is generated from the BRTMR module 362 in FIG. 14. The remote port 0 busy 430 and the remote port 0 Class 1 connected signals 434 are generated from the circuit described in FIG. 16. The block reason comes from the BRTBL 369. There is one DEQ0_FLAG signal for every PCM.

As shown in FIG. 15 each DEQ_FLAG 381, 382 signal is input into sixteen multiplexers 383, 384, representing the number of potentially blocked route requests. Multiplexer numeral 383 uses the port number in the BRRA register array in position 0, numeral 385, and multiplexer 384 uses the port number in the BRRA register array in position 16 numeral 386. For example if the contents of position 0 in the BRRA register array is port 4 then the DEQ4_FLAG is select by multiplexer 383 and output to the DEQIND0 signal 387. The DEQIND signals 387, 388 are used as inputs to the binary encoder block 389. The binary encoder block 389 takes the highest DEQIND signal, DEQ16IND being higher than DEQ0IND and encodes the value to a select 390 which selects the position in the BRRA 392, 393 to dequeue 394. For example if DEQ16IND signal is set then the port number contained in position 16 of the BRRA is output 394 from multiplexor 391.

FIG. 15 also describes a similar circuit which accounts for blocked route requests for Class 1 frames. The resulting port derived from this circuit takes precedence to the circuit previously described. This allows priority dequeueing of blocked route requests for Class 1 frames. The circuit uses the DEQx_FLAGs 387, 388 generated from multiplexors identified by numeral 383 and 384. The DEQx_FLAGs are ANDed with the remote port Class 1 connected signals generated in FIG. 16 numerals 434, 436 to form the inputs 396, 397 to the multiplexors identified by numeral 398 and 399. The multiplexors 398, 399 select the destination port contained in the BRRA array 400, 401. The output signals 402, 403 are binary encoded 404 to take the highest input signal to select the position in the BRRA 406, 407 to dequeue 408.

The inputs to multiplexor numeral 395 represent the oldest blocked route request 394 and the oldest blocked route request of a Class 1 frame 408. Multiplexor 395 will give priority to the Class 1 frame port 408 before choosing the oldest non-Class 1 route request 394. The resulting vector 409 is the blocked route request to dequeue.

This circuit can be used to unblock other types of resources besides Fibre Channel route requests. The circuit is implemented as combinatorial logic and selects the blocked route request within one clock.

9. Route Request Selector (RRS)

The Route Request Selector module 137 (RRS) in FIG. 4 functions to select between the incoming route request from the PCRRIM module 108 or the BRTBL 115. The resulting route request is output 110 to the Route Determination module. The RRS is controlled by the Route Control FSM 140.

10. Route Determination Module (RDM)

The Route Determination module 138 (RDM) in FIG. 4 applies rules defined in the ANSI Fibre Channel specifications to calculate how to route the incoming frame. The RDM receives the route request 110 from the RRS 137 along with route context for the source and destination ports 112 from the Route State Table 139. The RRS outputs the route results 145, 111 to both the Router Control FSM 140 and the PCRSPM 144. The RDM is implemented in combinatorial logic and applied the route rules in one clock.

Figure 20:
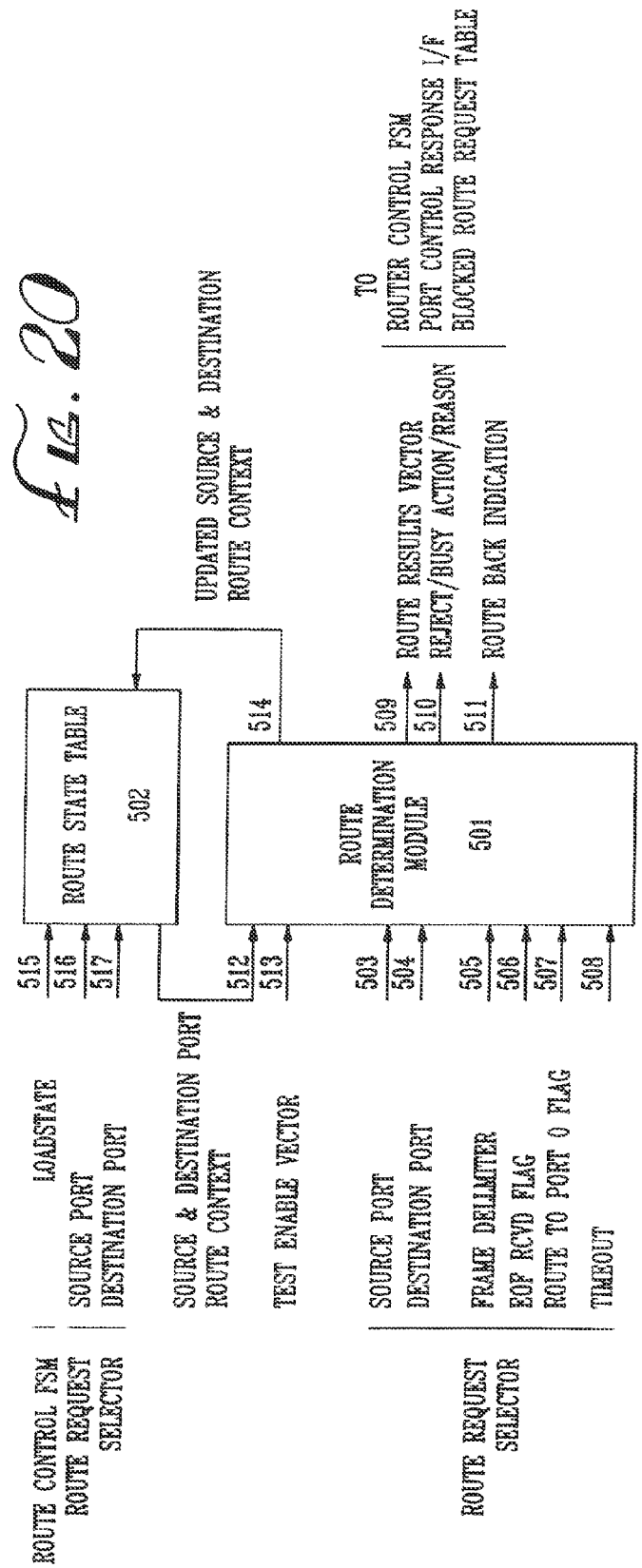
FIG. 20 is a diagram of both the Route State Table and the Route Determination modules.

FIG. 20 shows the RDM 501 in more detail. The RDM reads the route request from the RRS which includes the source requesting port 503, the destination port 504, the frame SOF delimiter 505, the EOF received flag 506, the route to port 0 (i.e., fabric controller) flag 507 and the timeout indication 508. The RDM also reads in the route table context for both the source and destination ports 512 and reads in a test enable vector 513. The test enable vector 513 turns off selected route rule checks for more flexibility when the router is implemented in an ASIC. The outputs from the RDM include the route results vector 509, 510 which indicates whether to route the frame or return an error, the reject/busy action/reason vector 10 which is valid when the RDM detects an error and the route back indication 511 which signals the port that the frame is in error and will routed back to the same port. Finally the updated source and destination port contexts are updated to reflect the RDM actions 514 and wired back to the route state table 502.

Figure 21:
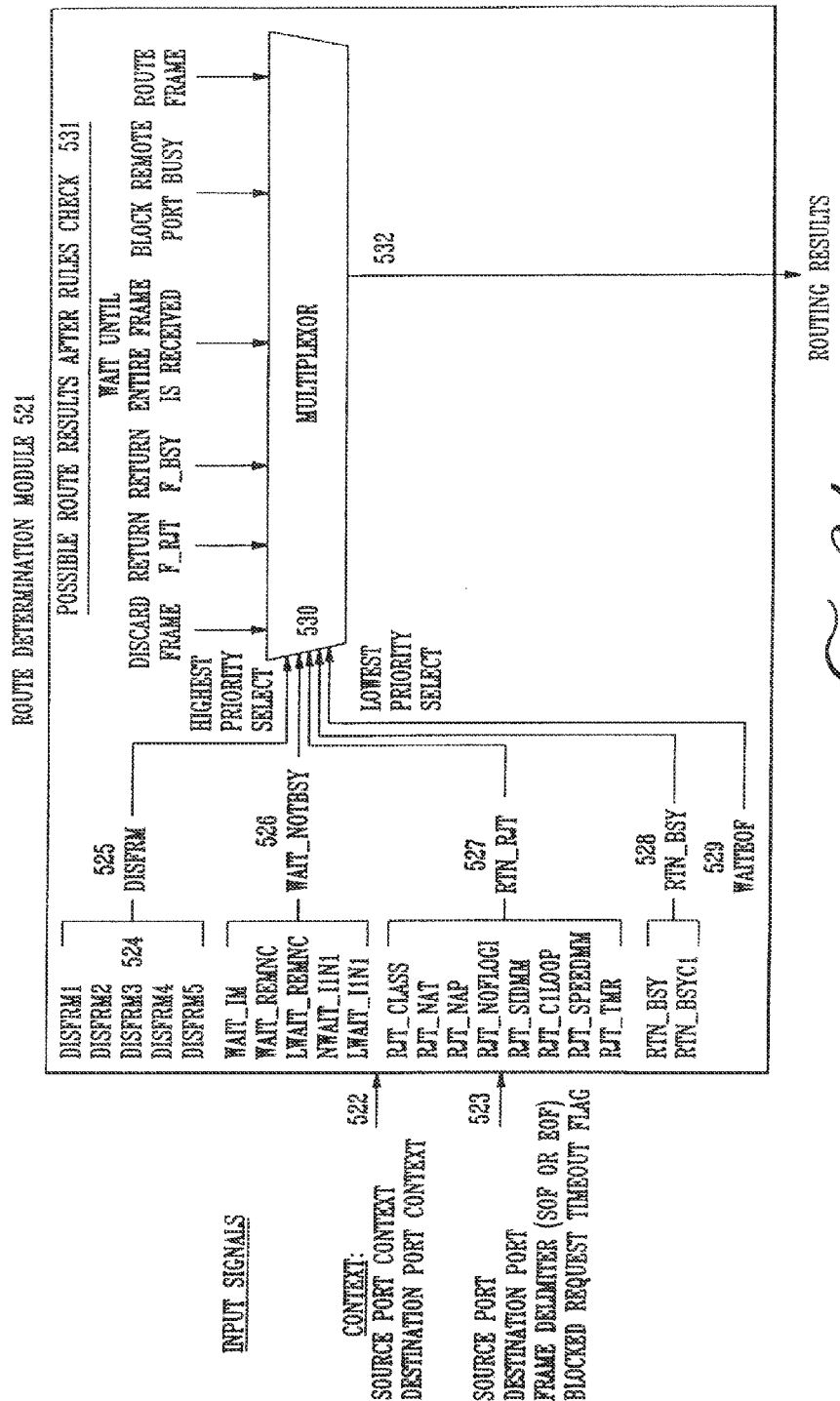
FIG. 21 is a more detailed diagram of the Route Determination module.

FIG. 21 shows the RDM route selection logic in more detail. As mentioned earlier the inputs to the RDM include the route state context for both the source and destination ports 522 and the route request 523. The RDM has prewired rules checks to detect five conditions: discard frame 525, block the route request until the remote port is not busy 526, return a fabric reject (F_RAT) frame 527, return a fabric busy (F_BSY) frame 528, wait until the frame is completely received 529. If all of the four conditions are not detected then the frame should be routed successfully to the remote port. The conditions mentioned above are derived from the ORing of multiple rules checks. For example the discard frame signal is derived from the ORing of five discard frame rules checks. An example rules check is shown below.

//discard frame if local SOFc1 received and local port is in a class 1 connection wire DISFRM4=TEN[2]&& DELIM==SOFn1 && SRC_CSTATE==Connected;

The TEN[2] term above selects a bit from the test enable vector. Turning the bit off will disable the above rules check. The rule above will assert the DISFRM4 signal if the incoming frame contains an SOFn1 delimiter and the incoming port is not already in a Class 1 connection.

As shown in FIG. 21 all potential rules check results 531 are encoded and selected by using the rules checks 525, 526, 527, 528, 529 as the multiplexor selector. The routing result selected is then output 532 to both the Router Control FSM and the PCRSPM. All rules checks are completed within one clock period.

Figure 22:
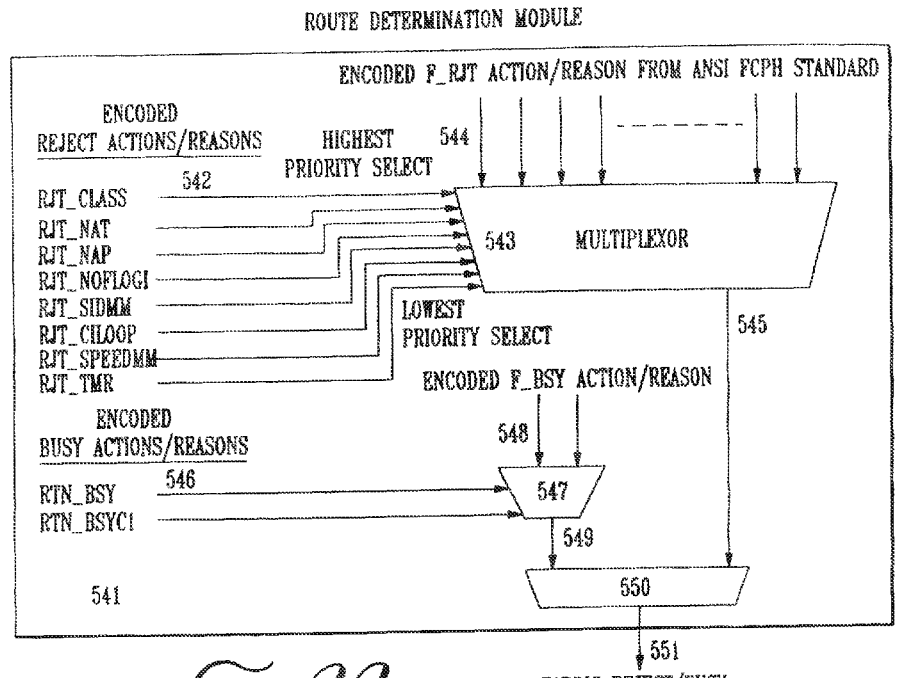
FIG. 22 is a another more detailed diagram of the Route Determination module.
Figure 23:
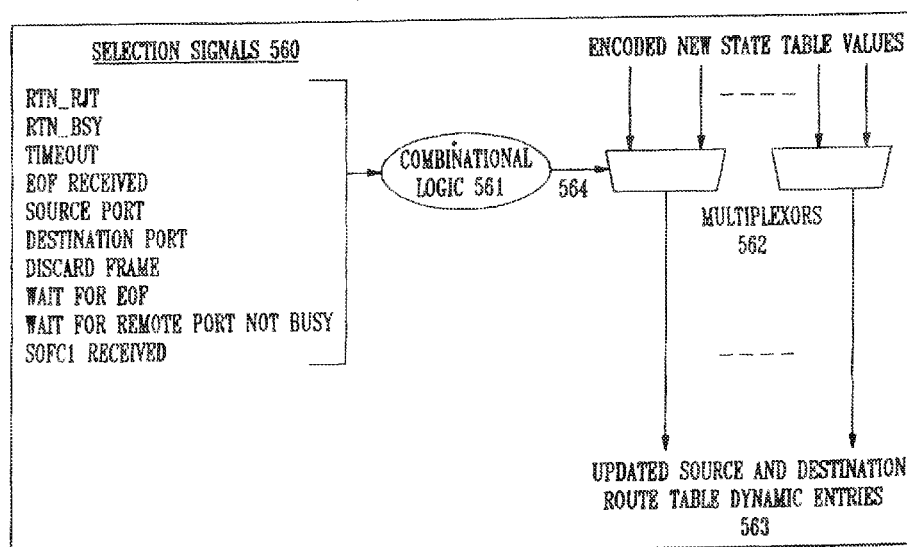
FIG. 23 is a still another more detailed diagram of the Route Determination module.

Finally FIG. 22 shows how the preencoded fabric reject 544 and fabric busy responses 548 are selected by the fabric reject 542 and fabric busy 546 rules checks. The result 551 is output to the PCRSPM module to be included in the route response.

11. Route State Table (RST)

FIG. 4 shows the Route State Table (RST) 139. The function of the RST is to keep the current context for each port. The RST interfaces with the Route Determination Module (RDM) 138, the Route Request Unblock Determination Module (RRUNB) 136 and the processor in the Fabric Control module 121. FIG. 20 shows the RST 502 in relation to the RDM 501. The RST is controlled by the Router Control FSM which signals the RST 515 to either output the source and destination context 512 or save the updated source and destination context 514. The RST outputs certain context fields into the RRUNB FIG. 4 numeral 124 to assist in route request unblocking calculation.

Figure 34:
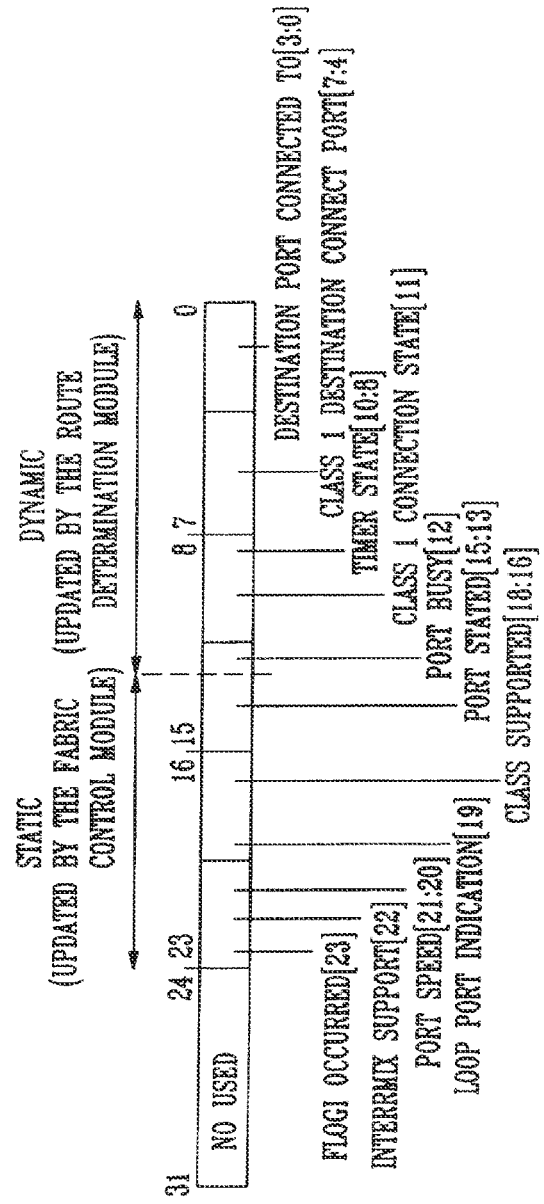
FIG. 34 is a diagram of the format of the Route State Table entry.

The RST contains a context entry for each port. The context entry is shown in FIG. 34. There are two parts to the route context: a static portion which is updated by the processor in the Fabric Control module FIG. 2 numeral 54 and a dynamic portion updated by the RDM module FIG. 4 numeral 138. The processor updates the static portion upon infrequent events such as power up and fabric login. The RDM updates the dynamic portion on a per frame basis. In current commercially available fabrics a processor manages all of the route state table fields, the current embodiment uses a register memory in the RST and the RDM to update the context. The table below lists the context fields.

| Signal | Description |
| --- | --- |
| Destination Port Connected To | If a route exists this specifies the remote port. |
| Class 1 Destination Port | If this port is in a Class 1 connection this field specifies the remote port. |
| Timer State | If this port is waiting for a route and a timer is enabled, this field specifies the timer. |
| Class 1 Connection State | This field specifies whether this port is currently in a Class 1 connection. |
| Port Busy | This field specifies whether this port is currently routing a frame to a remote port. |
| Port State | This field specifies the link state, whether initializing, offline, online, or error. |
| Class Supported | This field specifies the Classes of service supported by this port. |
| Loop Port Indication | This field specifies whether this port is a loop port or a point to point port. |
| Port Speed | This field specifies the link speed for this port. |
| Intermix Support | This flag specifies support for Intermix for this port. |
| FLOGI occurred | This field specifies whether a FLOGI/ACC exchange occurred. |

12. Router Statistics Gathering Module (RSG)

FIG. 4. shows the Router Statistics Gathering Module (RSG) 141. The RSG gathers fabric generated statistics. The RSG is enabled by the Router Control FSM 140 and has as inputs the source and destination ports, the route result and the frame Class 142. The RSG is implemented in hardware because of the requirement of collecting statistics at gigabit rates.

13. Router Control FSM (RCFSM)

Figure 18:
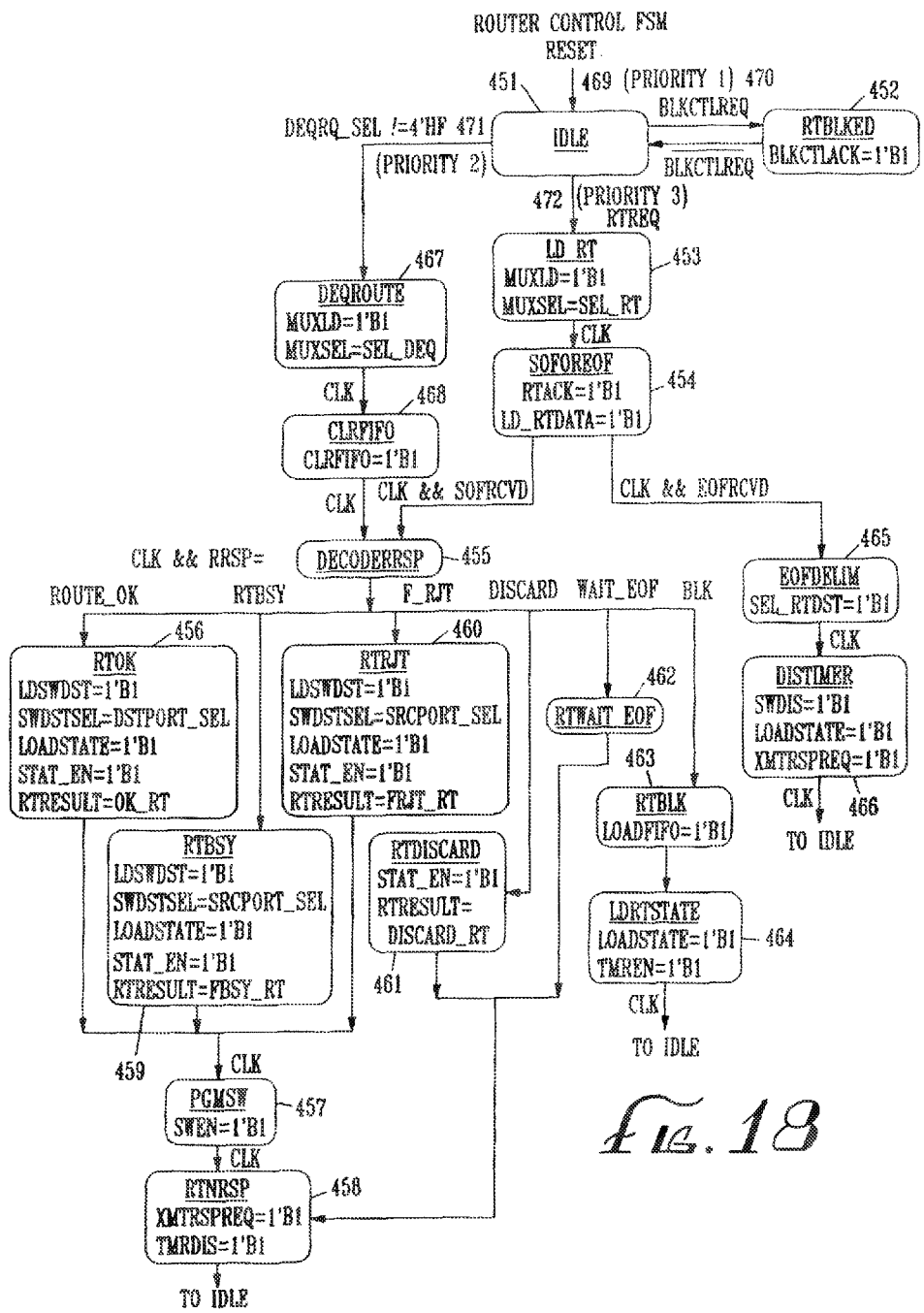
FIG. 18 is a diagram of the Router Control State Machine.

FIG. 4 shows the Router Control FSM (RCFSM) 140. The RCFSM controls the entire router through control signals to the internal router modules 147. The RCFSM state diagram is shown in FIG. 18.

The RCFSM is triggered from idle by one of three events: a processor request to read or write a router data structure 470, a blocked route request becoming unblocked 471 or an incoming route request received from a port control module signal 472. The three events are prioritized in case of multiple simultaneous events. The priorities from high to low include: 1) processor request, 2) a blocked route request becoming unblocked and 3) an incoming route request. When a processor updates any of the router fields the router must be in a quiescent state, i.e., not updating any data structure. When a processor requests access to a router data structure the processor signals the RCFSM by asserting the BLKCTLREQ signal. If in idle the RCFSM enters the RTBLKED state 452 and waits until the processor has finished its access. While in the RTBLKED state the RCFSM signals it is in this state by asserting the BLKCTLACK signal. The router processor interface logic will hold off the processor access via a WAIT signal until the BLKCTLACK signal is enabled.

The remaining RCFSM diagram states and description is discussed below. Refer to FIG. 18 for the state diagram and to FIG. 4 for the module description.

| State | Description |
| --- | --- |
| DEQROUTE 467 | Program RRS 137 to use the newly unblocked route request as an input 115 |
| CLR_FIFO 468 | Signal the BRTBL 133 to remove the blocked route |
| DECODERRSP 455 | Wait one clock for the RDM 138 to apply routing rules checks to the route request 110 |
| RTOK 456 | The RDM 138 has determined the route is ok. Signal the RST 139 to update the route table, signal the RSG 141 to collect statistics for this route and select the destination port from the ADM 131 results. |
| RTBSY 459 | The RDM 138 has determined to return a fabric busy (F_BSY) frame to the sending port. Signal the RST 139 to update the route table, signal the RSG 141 to collect statistics and assign the destination port from the source port (i.e., route F_BSY back to the same port). |
| RTRJT 460 | The RDM 138 has determined to return a fabric reject (F_RJT) frame to the sending port. Signal the RST 139 to update the route table, signal the RSG 141 to collect statistics and assign the destination port form the source port (i.e., route F_RJT back to the same port). |
| RTDISCARD 461 | The RDM 138 has determined that the port control module should discard the frame. Signal the RSG 141 to collect statistics. |
| RTWAIT_EOF 462 | The RDM 138 has determined that the port control module should wait until the entire frame is received before resubmitting the route request. |
| RTBLK 463 | The RDM 138 has determined to block the route request. The BRTBL 133 and the BRRA 134 are signaled to save the route request and save the port requesting the route. |
| PGMSW 457 | Program the switch core 123 to make a path from the source to the destination port. |
| RTNRSP 458 | Signal the PCRRSPM 144 to return a route request complete indication. |
| LDRTSTATE 464 | Signal the RST 139 to update its context and signal the BRTMR 104 to enable a blocked route request timer. |
| LD_RT 453 | Signal the RRS 137 to read the route request 108 that was just read from the PCRRIM 130. |
| SOFOREOF 454 | Signal the PCRRIM 130 to fetch another route request since the current request is registered in the RRS 137 module. Load the route results from the RDM 138 into the PCRRSPM 144 (in case delimiter is an EOF). Go to the DECODERRSP 455 state if the delimiter in the route request is an SOF otherwise go to the EOFDELIM 465 state. |
| EOFDELIM 465 | Signal the RRS 137 to use the destination port from the route context in the RST 139. |
| DISTIMER 466 | Signal the switch core to disconnect the path from the specified source port to the destination port, signal the RST 139 to update the route table context to reflect the disconnected path and signal the PCRRSPM 144 to return a route request complete indication. |

E. Port Control

FIG. 2 shows the Port Control (PC) locations 51, 70, 74, 75, within the fabric block diagram. Preferably, there is one PC per port or link. The PC interfaces with the fabric attached device through either copper or fiber media 56, 77, 78. The PC interfaces to the switch core through transmit 58 and receive 57 data buses and control signals. The PC interfaces to the router through route request 59, 61, 66, 72 and route response 60, 62, 67, 73 buses and control signals. Finally the PC interfaces to the Fabric Control module through a processor interface bus 65.

Figure 5:
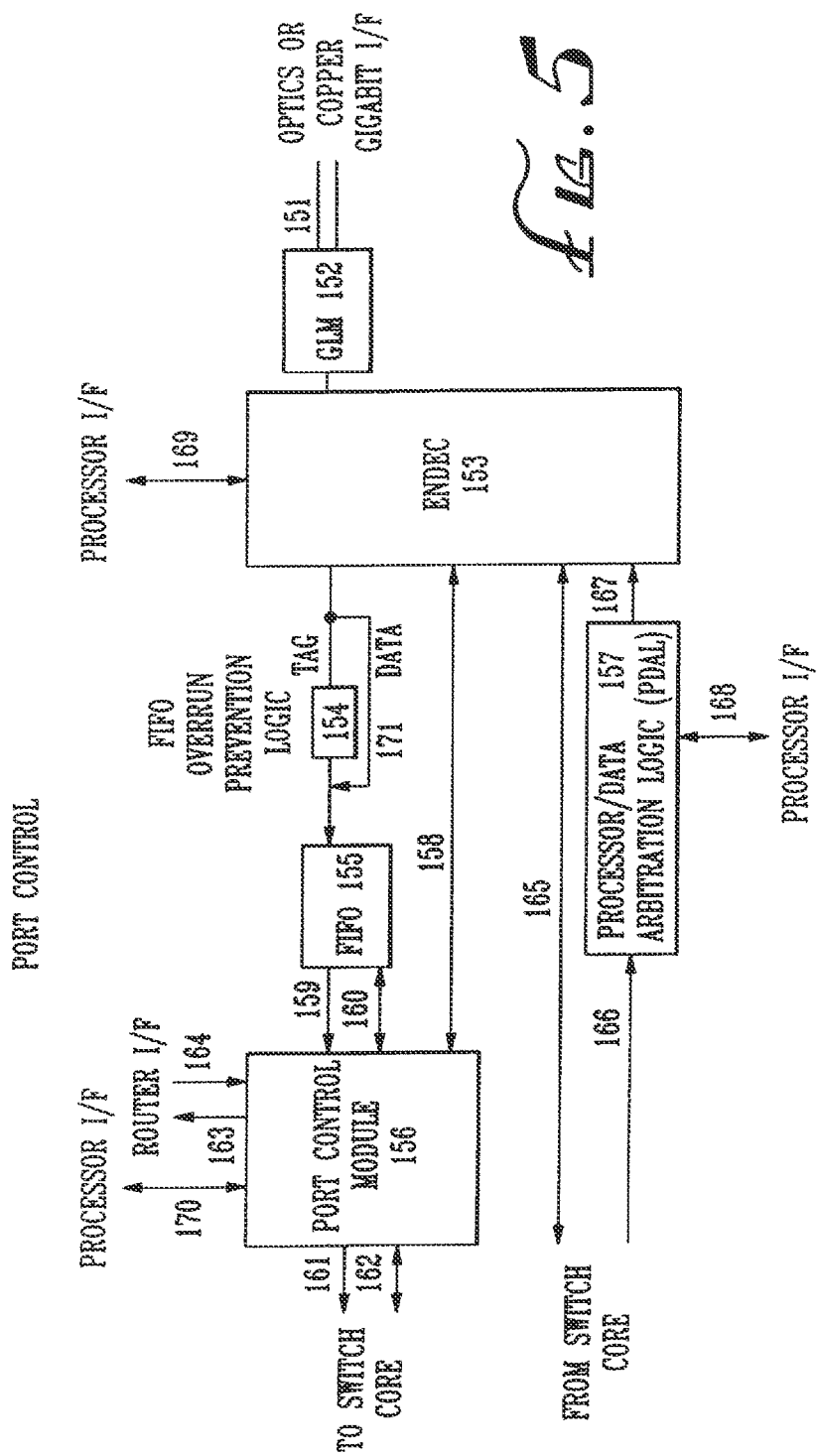
FIG. 5 is a block diagram of the fabric Port Control.

FIG. 5 shows the Port Control in more detail. Frames are received from the fiber or copper link 151 and enter the Endec 153. The Endec implements the 8B/10B encoding/decoding, the loop port state machine and fabric/point-to-point state machine functions and outputs thirty two bit data words with two bits of parity and tag information to the receive FIFO 155. The PC contains a module which guards against a receive FIFO overrun 154 condition. Once the receive FIFO 155 starts filling, the Port Control Module (PCM) 156 reads the frame header, requests a route from the router 163, 164 and forwards the frame to the switch core 161, 162. The PCM is configurable by the processor 170 in the Fabric Control module. The Port Control also receives frames from the switch core 165, 166 to be transmitted by the Endec 153.

Port Control Module (PCM)

Figure 10:
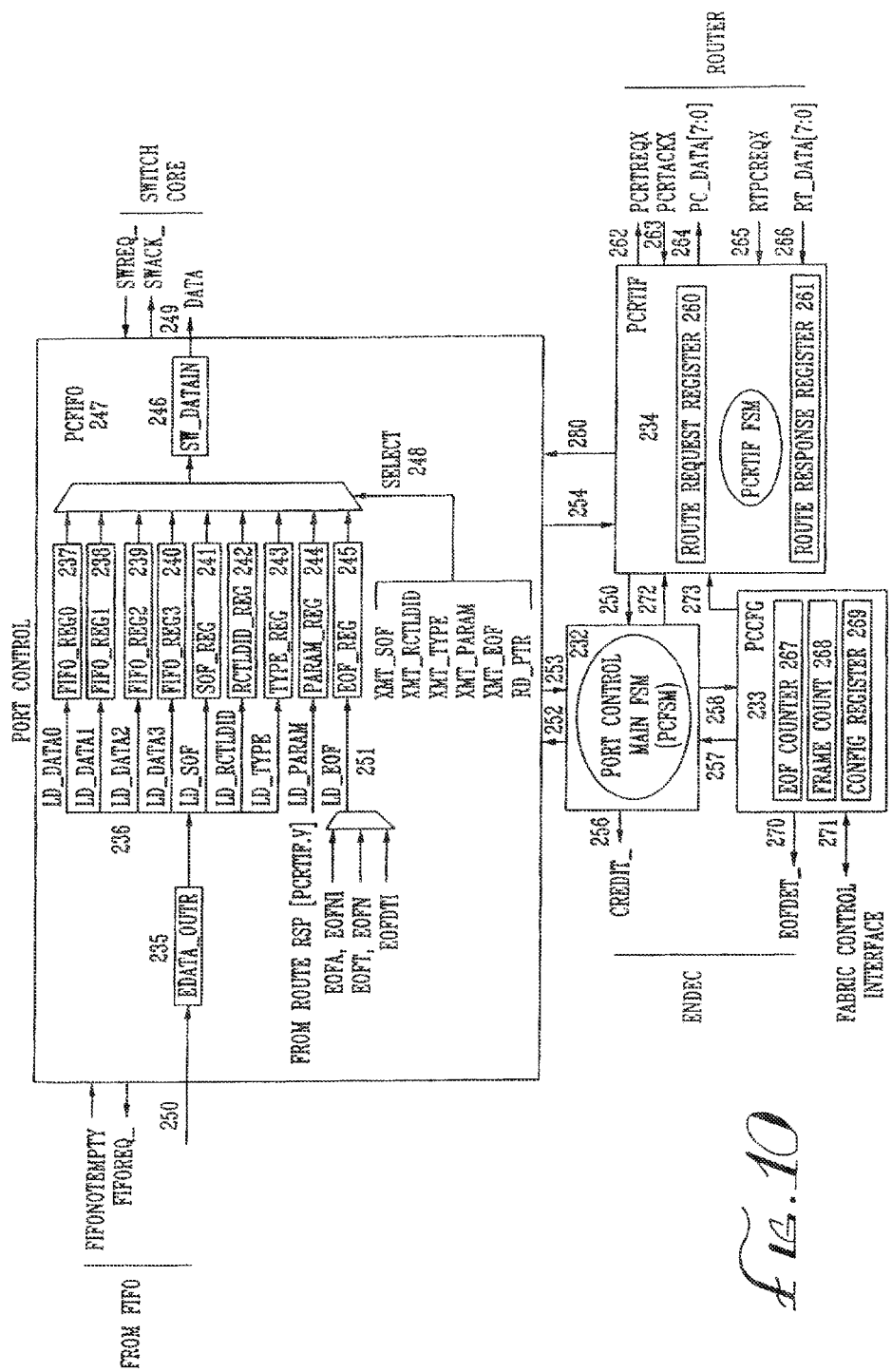
FIG. 10 is a more detailed description of the Control module.

FIG. 10 shows the Port Control Module (PCM) in more detail. The PCM is responsible for reading a portion of the received header from the input FIFO 250, building a route request for the router 262, 263, 264, 260, receiving the route response from the router 265, 266, 261 and either forwarding the frame to the switch core 249 or building a fabric reject (F_RJT) or fabric busy (F_BSY) frame and forwarding those to the switch core. The PCM also performs miscellaneous functions such as receive frame validation against parity errors, short frames, frames too large, tag errors and other checks.

The PCM is composed of the following four modules:
(1) Port Control FIFO Module (PCFIFO) 247
(2) Port Control to Router IF Module (PCRTIF) 234
(3) Port Control Main Control FSM (PCFSM) 232
(4) Port Control Configuration/Counter Module (PCCFG) 233

1. Port Control FIFO module (PCFIFO)

FIG. 10 shows the Port Control FIFO module (PCFIFO) 247. The PCFIFO buffers several words of the incoming frame with internal registers. The registers include four general input registers (fifo_reg0 237, fifo_reg1 238, fifo_reg2 239, fifo_reg3 240), five special input registers (sof_reg 241, rctldid_reg 242, type_reg 243, param_reg 244, eof_reg 245) and a main input and output register (EDATA_OUTR 236 and SW_DATAIN 246). The input register (EDATA_OUTR) gates the data in from the input FIFO 250 by asserting the FIFOREQ_signal. The output register sends the data to the switch core by asserting the SWACK_signal 249. The general and special input registers are loaded from the EDATA_OUTR register. The general and special registers also are connected to a multiplexor which feeds the SW_DATAIN register 246. The special registers allow the PCFIFO to build fabric reject (F_RJT) and fabric busy (F_BSY) frames and to insert special EOF delimiters when the route response 261 specifies to do so.

The received destination address (D_ID) along with the SOF delimiter is wired to the PCRTIF module 254 to build the route request 260. Finally the PCFIFO is controlled by the PCFSM 232.

The PCFIFO module performs certain frame validations. These validations include parity and tag field checking and regeneration, CRC, invalid transmit word and link down while receiving frame validations. When the frame validations fail the PCFIFO automatically inserts the appropriate EOF delimiter 251, either an EOFa, EOFni or EOFdti.

The PCFIFO will build a fabric frame reject (F_RJT) when the route response from the router specifies to do so 261. The PCFIFO builds the fabric reject by changing certain fields in the frame header 241, 242, 244. Since the entire header is not yet in the PCFIFO internal registers a counter is implemented to indicate when to insert the modified header fields. The frame fields which are modified include the R_CTL field 242, the parameter field 244 and potentially the EOF delimiter 245. In addition if there was a payload associated with the frame it is discarded.

The PCFIFO will also build a fabric busy (F_BSY) frame when the route response from the router response specifies to do so 261. The PCFIFO modifies the R_CTL field 242, the type field 243 and potentially the EOF delimiter 245. As in the F_RJT frame modification the payload for the F_BSY frame is discarded.

2. Port Control Main Control Module (PCFSM)

Figure 11:
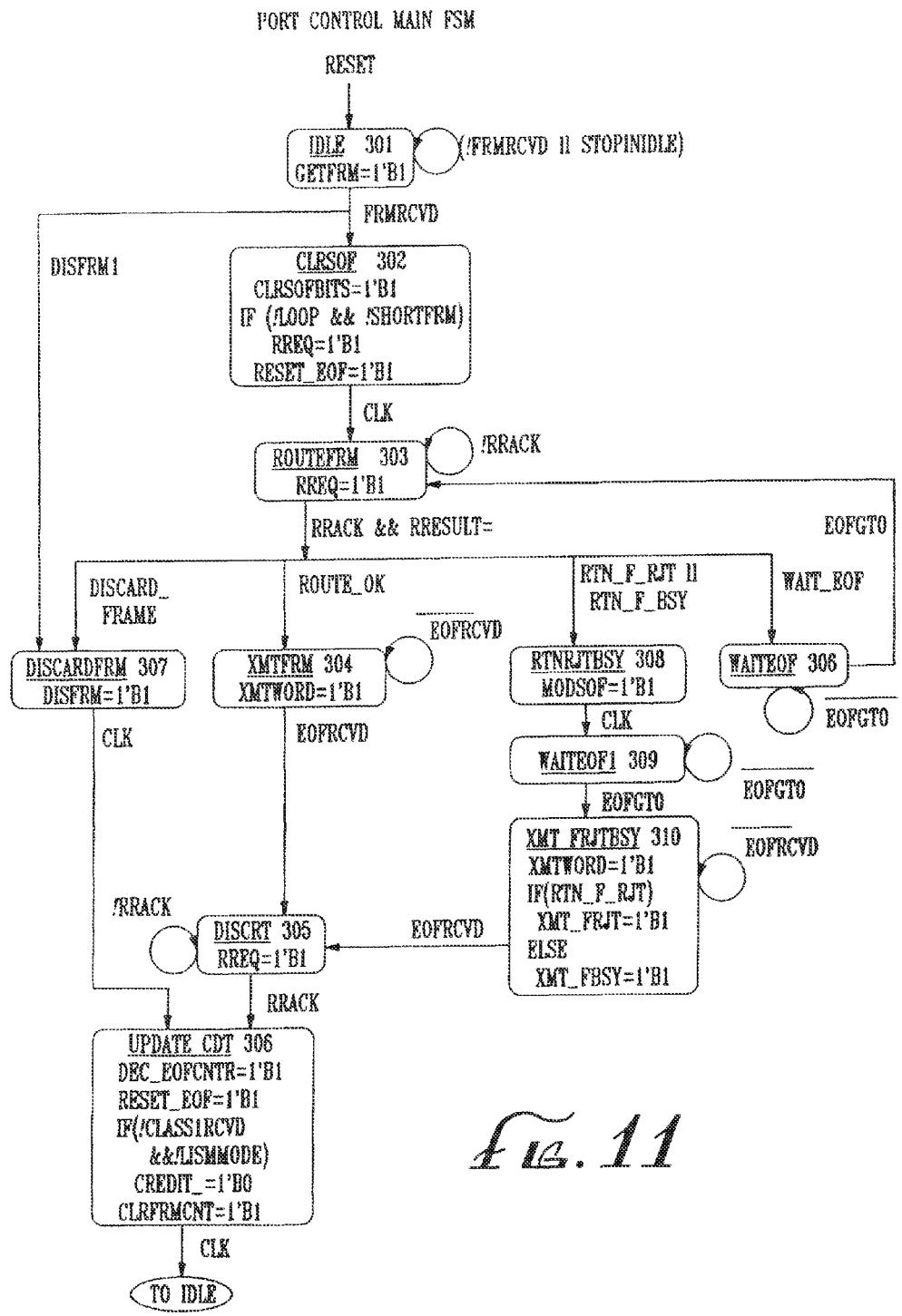

FIG. 10 shows the Port Control Main Control Module (PCFSM) module 232 (PCM). The PCFSM controls the other modules which compose the PCM 252, 258, 272. The PCFSM is triggered by a frame being received from the input FIFO. FIG. 11 shows the PCFSM state diagram and is described in detail below.

| State | Description |
|---|---|
| IDLE 301 | Wait until the first three words of a frame are received from the input FIFO. This is the first state after a system reset. |
| CLRSOF 302 | A frame has been received. Reset the EOF register and start the route request signal if the frame is not a short frame. |
| ROUTEFRM 303 | In this state the PCFSM signals the PCRTIF to send a route request (RREQ) to the router. The PCFSM will loop in this state until a route response (RRACK) is received back from the router. |
| XMTFRM 304 | Transmit the frame through the Port Control from the input receive FIFO to the switch core. |
| RTNRJTBSY 308 | The router has determined that a fabric reject (F_RJT) or fabric busy (F_BSY) frame should be returned. The SOF delimiter is modified along with the R_CTL field. |
| WAITEOF 306 | Wait until an EOF is received. The Port Control usually implements cut through routing, i.e., when a frame is received it is forwarded to the remote before the end of frame is received. Certain conditions dictate that the frame should be received in its entirety before being forwarded. An example condition includes the remote port speed is lower than the source port. |
| DISCRT 305 | Signal the PCRTIF to send a route disconnect request (RREQ) and loop in this state until a route disconnected response (RRACK) signal is received. |
| UPDATE_CDT 306 | This one clock state is entered into after transmitting or discarding a frame. If a Class 2 or Class 3 frame was operated on the Endec CREDIT_signal is pulsed. The EOF register (RESET_EOF) is cleared, the frame counter is cleared and the EOF in received FIFO counter is decremented. |
| WAITEOF1 309 | Wait until an EOF is received from the Endec due to a F_RJT/F_BSY frame being returned. An EOF must be received so as to not cause a transmitter underrun at the remote Endec. |
| XMT_FRJTBSY 10 | Wait until an EOF is transmitted which signals that the F_RJT or F_BSY EOF was transmitted. While in the XMT_FRJTBSY state assert either the xmt_frjt or xmt_fbsy signal to the PCFIFO module to specify which frame to transmit. |

3. Port Control Configuration/Counter Module (PCCFG)

FIG. 10 shows the Port Control Configuration/Counter (PCCFG) module 233. The PCCFG maintains counters and provides the processor interface 271 to the Port Control Module. The PCCFG contains an EOF received counter 267, a current frame count register 268 and a ort control configuration register 269. The EOF received counter keeps track of the number of full frames received by the Endec contained in the receive frame FIFO. The current frame count register monitors the current number of words received on a per frame basis. This counter is used to detect short and long frames. Finally the port control configuration register contains miscellaneous information/configuration information used by the Port Control module.

The port control configuration register fields are described below.

| Field | Bit Location | Description |
|---|---|---|
| Max Frame Size | 9:0 | Indicates the maximum receive frame size in words. |
| LISM Mode | 10 | The Port is currently going through loop initialization indication |
| Clear Interrupt | 11 | Clear the bad parity notification interrupt. |
| Pulse CDT_ line | 12 | Pulse the Endec credit line. |
| Clear Interrupt | 13 | Clear interrupt latch |
| Enable Remote Port Routing | 14 | Enable preemptive remote port routing. |
| This Port Number | 19:16 | |
| EOF Counter | 26:24 | Counter value for the number of EOF delimiters received from the Endec. |
| Frame Discarded | 27 | Frame was discarded by the Port Control. |
| Frame Too Short Detected | 28 | A frame which was less than eight words in length was received. |
| Frame Too Big Received | 29 | A frame which was greater than the specified maximum frame size (bits 9 to 0) was received. |
| Tag Error occurred | 30 | A tag error was detected (i.e., a tag of either 00 or 11). |
| Parity Error occurred | 31 | Clear parity interrupt indication register. |

4. Port Control to Router Interface Module (PCRTIF)

FIG. 10 shows the Port Control to Router Interface Module (PCRTIF) 234. The PCRTIF builds route requests for the router 260, signals the router that a valid request is present 262, waits for a router response valid signal (RTPCREQ) 263 and receives the router response 261. The PCRTIF builds the route request from the D_ID field, the SOF delimiter and some miscellaneous signals from both the PCFIFO 254 and the PCCFG 273 modules. The route request is transmitted over a shared command channel bus 264 to the router. This command channel bus is shared by all the PCMs. The route response is received over a different shared response channel bus (RT_DATA) 266 which is also shared by all the PCMs. By implementing different buses or channels for the route request and route response the router can simultaniously read route requests along with returning route responses.

FIFO Overrun Prevention Logic (FOPL)

FIG. 5 shows the FIFO Overrun Prevention Logic (FOPL) 154 within the Port Control area. The purpose of the FOPL is to handle the case where the FIFO 155 is full and frames are received by the Endec 153. Since the frame arrival rate is extremely fast at gigabit link data rates, the FOPL must act in real time. An additional situation the FOPL must handle is when the frame arrives and is being routed to the remote port and the back end of the frame overruns the FIFO. Still another situation is where multiple frames overrun the FIFO. The FOPL operates on the TAG bits 154 not the data bits 171. The Endec takes gigabit serial transmission from the link side, decodes the transmission and outputs thirty two bit words to the port control FIFO. Along with the thirty two bit words are a two bit tag field and a two bit parity field. The tag and parity field additions are a common interface characteristics. Tag bits are bits attached to the thirty two bit words to indicated delimiters such as the SOF or EOF. When the FIFO is full and a frame is received from the Endec the FOPL sets the tag bits to an illegal value. When the FIFO enters the not full condition the next word will contain the illegal tag bits. The illegal tag bits will signal the Port Control module to abort the frame with the appropriate EOF delimiter.

Figure 8:
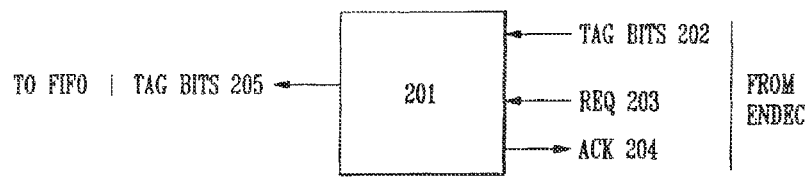
FIG. 8 is a diagram of the Control FIFO Overrun Prevention Logic.

FIG. 8 shows the FOPL in more detail. The FOPL 201 interfaces with the Endec tag bits 202, the Endec receive frame DMA request signal 203, and the Endec receive frame DMA acknowledgement 204 signal. The FOPL interfaces with the FIFO by supplying the tag bits and through the FIFONOTEMPTY 206 signal. During normal operation the FOPL, will set the FIFO tag bits 205 to the value of the Endec tag bits 202. When the FIFO is full, i.e., when the FIFONOTEMPITY signal 206 is deasserted, the FOPL will output an illegal value for the tag bits 205 going to the FIFO. If the overflow word is the last word to be received the FOPL will wait until the FIFONOTEMPTY signal 206 is asserted and then output a word with bad tag bits by asserting the FIFOWRITE 207 signal. This last scenario handles the case where the last word received overflows the FIFO and there are no other words to receive.

Processor/Data Arbitration Logic (PDAL)

FIG. 5 shows the Processor/Data Arbitration Logic (PDAL) 157 within the Port Control area. Since the Endec 153 multiplexes the transmit bus with the internal register configuration bus, logic is needed to arbitrate between processor accesses 168 and frames being transmitted from the switch core 166. This logic must manage processor accesses to the Endec which are slower than transmit data word dma's. In other words if a frame is currently being transmitted, processor accesses to the Endec must be held off until either the frame transmission is complete or the internal Endec transmit FIFO is full, allowing enough time for a processor access before a transmitter underrun occurs.

Figure 9:
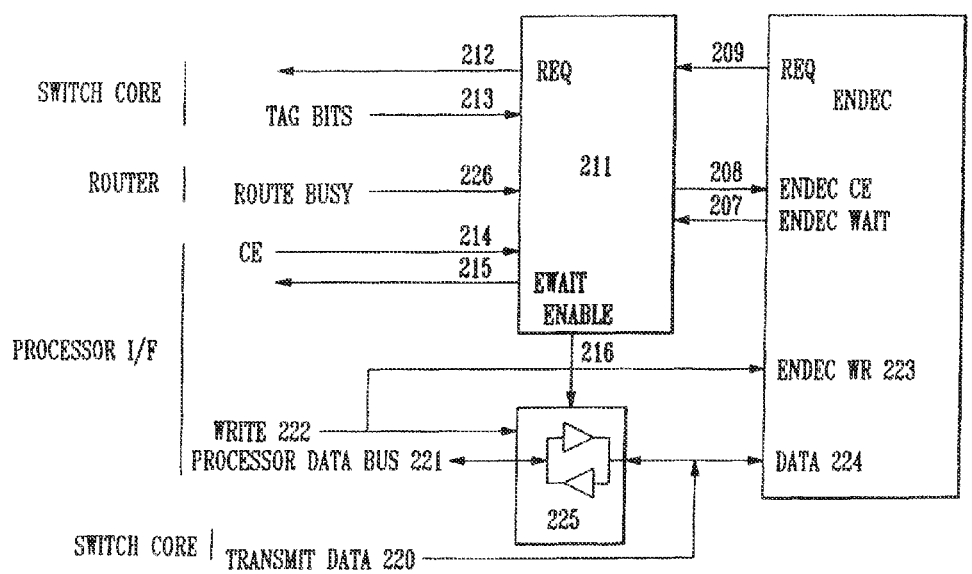
FIG. 9 is a diagram of the Control Process to Endec Arbitration Logic.

The PDAL acts as the arbitrator between processor accesses and transmit data to the Endec. The PDAL accomplishes this by keeping track of when the switch core is transmitting frames to the Endec and inserting processor accesses between frames or when the Endec's internal transmit FIFO is full. FIG. 9 shows the PDAL in more detail. The PDAL interfaces to the Endec through the Endec transmit frame DMA request 209 signal, the chip select 208 and the wait 207 signals. The PDAL interfaces with the switch core through the transmit frame dma request signal 212. The PDAL interfaces with a bus transceiver 225 through an enable signal 216. The PDAL interfaces with the processor from the Fabric Control module through the chip select 214, wait 215 and write 222 signals. Finally the PDAL interfaces to the Router Module through the route busy 226 signal. The processor will only access the Endec transmit/configuration bus 224 when the wait signal 215 is deasserted. The PDAL uses two conditions to create the processor wait signal. The first condition is that there are no frames being transmitted to the Endec. This condition is indicated by the route busy signal 226 from the router being deasserted. The second condition is the transmit frame dma request signal 209 deasserted, indicating that the internal Endec transmit FIFO is full. The second condition creates enough time for a processor access to the Endec internal registers before the Endec's internal transmit FIFO empties.

Port Control Hub Module

Figure 29:
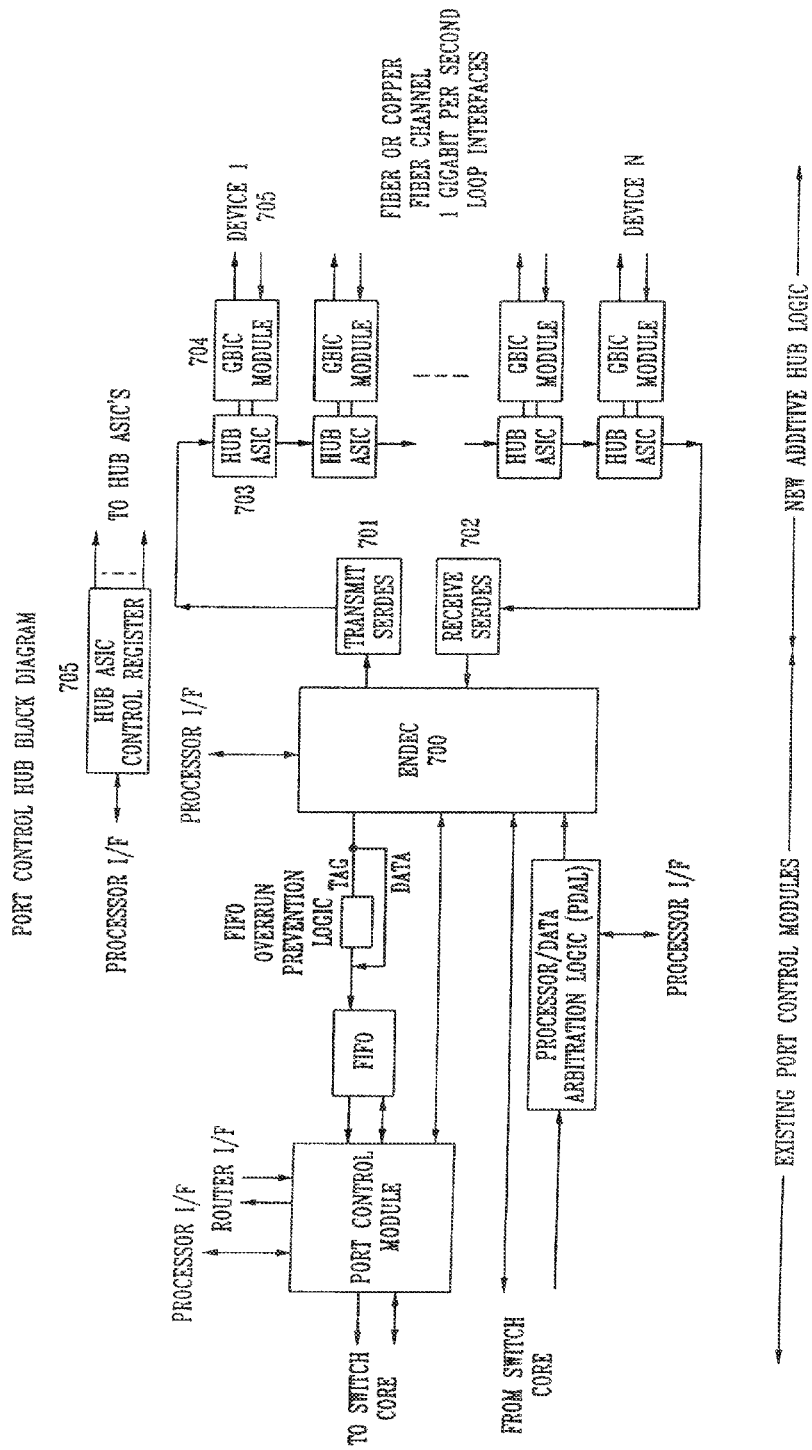
FIG. 29 is a diagram of the Hub Port Control module.

FIG. 29 shows the Port Control Hub Module (PCHM). The PCHM extends the functionality of the Port Control Module by adding several Fibre Channel Arbitrated Loop Hub ports. This has the affect of leveraging a single switch port over multiple attached devices 705. All attached devices 705 are logically on a single loop connected to the switch through an internal Endec 700. The internal Endec is connected on the loop by both a transmit 701 and receive 702 serdes modules. The output of the serdes module is a gigabit serial stream of data. The loop is repeated by commercially available 1.0625 Gbit/sec Channel Repeater/Hub Circuits 703 such as Vitesses' VSC7120. (See, e.g., Vitesse Semiconductor Corporation "1996 Communications Products Data Book"). The repeater/hub circuits contain a monolithic Clock Recovery Unit (CRU), a digital Signal Detect Unit (SDU) and a Port Bypass Circuit (PBC). The repeater/hub circuits allow devices to attach and detach without interrupting the loop. The repeater/hub circuits are connected to a Gigabit Interface Converter (GBIC) module 704 which supports either copper or fiber media via a plug in module. All repeater/hub circuits are controlled by the fabric control processor through a register 705. This allows the fabric control module to monitor the state of each port and integrate the status with the general switch network management.

The integral hub provides many advantages over standalone hubs. These advantages include:

Leveraging the redundant power supplies and fans usually resident in the fabric

Segmenting loops to allow for increased performance per loop and greater immunity from loop failure Allowing for hot pluggable hub boards Leveraging the switches SNMP network management capability for greater control and monitoring of the loop.

F. Switch Core

Figure 6:
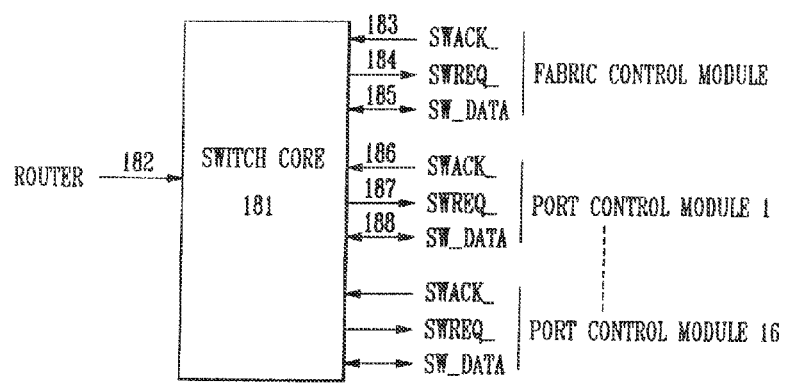
FIG. 6 is a block diagram of the fabric Switch core

FIGS. 2 and 6 shows the Switch Core. The switch core implements a nonblocking N×N matrix switch. The input to the switch core comes from the individual Port Control modules FIG. 2 numerals 57, 69 and FIG. 9 183, 186. The output from the switch core is wired to the Endec FIG. 2 numeral 58, FIG. 9 numeral 220 and the Brouter Module FIG. 2 numeral 76. The switch core is paths are setup and torn down by the router FIG. 2 numeral 63.

G. Brouter Module

Figure 7:
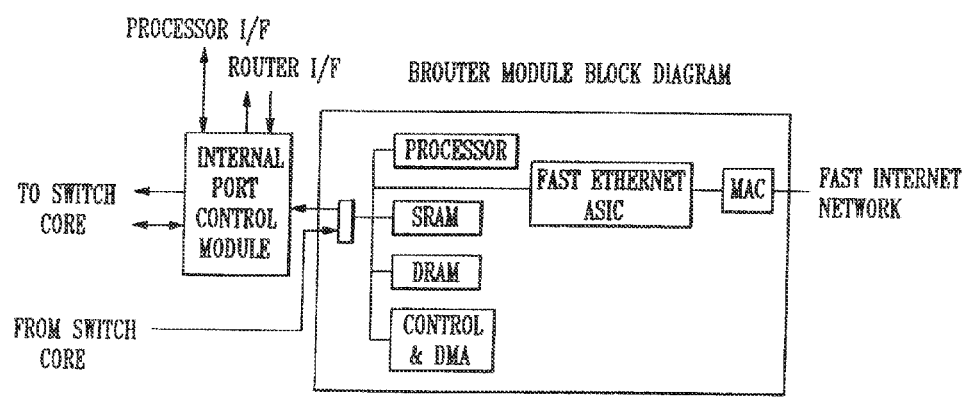
FIG. 7 is a block diagram of the Brouter Module.

FIG. 2 numeral 55 and FIG. 7 show the Brouter Module. The Brouter Module receives frames from the switch core 76 and transmits frames to the internal Port Control module 70. The Brouter Module is responsible for converting Fibre Channel frames to frames to frames of the connected network 68. The Brouter Module looks to the rest of the fabric like a Port Control module. The Brouter module sends and receives frames which adhere to the Fibre Channel protocol. The frames are converted within the Brouter module to other network frames such as Ethernet, Fast Ethernet, or Gigabit Ethernet and are transmitted out to the network connection 68.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

H. Other Documents

ANSI X3.230-1994, "Fibre Channel Physical and Signaling Interface (FC-PH)",

ANSI X3.297-1996, "Fibre Channel Physical and Signaling Interface (FC-PH-2)".

ANSI X3.303-1996, "Fibre Channel Physical and Signaling Interface (FC-PH-3)".

ANSI X3.272-1996, "Fibre Channel Arbitrated Loop (FC-AL)".

ANSI X3T11 Project #1133-D, "Fibre Channel Arbitrated Loop 2 (FC-AL2)".

ANSI X3T11/95-41, "Fibre Channel Fabric Generic Requirements (FC-FG), Rev 3.2"

ANSI X3T11 Project 1134-D "(FC-GS2)".

ANSI X3T11 Project 959-D "Fibre Channel Switch Topology (FC-SW)".

ANSI X3T11 Project 1235-DT, "Fibre Channel Fabric Loop Attachment (FC-FLA) Rev 2.2"

FCA "N_Port to F_Port Interoperability Profile, Rev 1.0"

I claim:

1. A controller for routing data and interconnecting a plurality of communications channels, the controller comprising:
   one or more ports;
   one or more bypass circuits operably connected to and corresponding in number to the one or more ports, wherein each of the one or more bypass circuits is operable to bypass a buffer;
   a data router operably connected to the one or more bypass circuits, the data router being operable to:
     monitor for data,
     decode a priority according to the data,
     block a route request according to a condition of the one or more ports,
     unblock the route request upon resolution of the condition of the one or more ports, and
     move the route request through the one or more bypass circuits according to the priority; and
   a logic circuit operably connected to the data router for interfacing the controller to a system bus of a host computer hosting the controller.

2. The controller of claim 1, wherein the one or more ports comprise an Ethernet port.

3. The controller of claim 1, wherein the controller comprises one or more FIFO buffers connected to and corresponding in number to the plurality of one or more ports.

4. The controller of claim 3, wherein the data router is operable to move the route request through the one or more FIFO buffers according to the priority.

5. The controller of claim 1, wherein the data router operates according to a signaling protocol.

6. The controller of claim 1, wherein the data router guards against a receive FIFO overrun condition.

7. The controller of claim 1, wherein the data router comprises a direct memory access (DMA) module.

8. The controller of claim 7, wherein the DMA module is operable to move the route request through a FIFO buffer or a bypass circuit in the one or more bypass circuits.

9. The controller of claim 1, wherein the data router is operable to monitor for data to be transmitted.

10. A controller for routing data, the controller comprising:
    an Ethernet port;
    a bypass circuit operably connected to the Ethernet port, wherein the bypass circuit is operable to bypass a buffer;
    a processor module operably connected to the bypass circuit, the processor module being operable to:
      monitor for data,
      decode a priority according to the data,
      block a route request according to a condition of the one or more ports,
      unblock the route request upon resolution of the condition of the one or more ports, and
      move the route request through the bypass circuit according to the priority; and
    a logic circuit operably connected to the processor module, the logic circuit operable to interface the controller to a system bus of a host computer.

11. The controller of claim 10, wherein the controller comprises a FIFO buffer connected to the Ethernet port.

12. The controller of claim 11, wherein the processor module is operable to move the route request through the FIFO buffer according to the priority.

13. The controller of claim 10, wherein the processor module operates according to a signaling protocol.

14. The controller of claim 10, wherein the processor module guards against a receive FIFO overrun condition.

15. The controller of claim 10, wherein the processor module comprises a direct memory access (DMA) module.

16. The controller of claim 15, wherein the DMA module is operable to move the route request through a FIFO buffer or the bypass circuit.

17. The controller of claim 10, wherein the processor module is operable to monitor for data to be transmitted.

18. A method for routing data, the method comprising:
    monitoring for data received by an Ethernet port;
    decoding a priority associated with the data;
    blocking a route request according to a condition of the one or more ports,
    unblocking the route request upon resolution of the condition of the one or more ports,
    selecting a route according to the priority, the route request being passed either through a bypass circuit or through a FIFO buffer; and
    moving data through the selected route.

19. The method of claim 18, wherein the FIFO buffer is operably connected to the Ethernet port.

20. The method of claim 18, wherein a direct memory access (DMA) module is operable to move the route request through the bypass circuit or the FIFO buffer.

* * * * *